(12) United States Patent
Koyama et al.

(10) Patent No.: US 10,641,634 B2
(45) Date of Patent: May 5, 2020

(54) FLOW METER

(71) Applicant: Keyence Corporation, Osaka (JP)

(72) Inventors: Takamasa Koyama, Osaka (JP); Sotaro Ito, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/268,514

(22) Filed: Feb. 6, 2019

(65) Prior Publication Data

US 2019/0285454 A1 Sep. 19, 2019

(30) Foreign Application Priority Data

Mar. 14, 2018 (JP) ................................ 2018-047215

(51) Int. Cl.
| | |
|---|---|
| G01F 1/66 | (2006.01) |
| G01K 1/14 | (2006.01) |
| G01K 1/16 | (2006.01) |
| G01K 13/02 | (2006.01) |
| G01F 15/075 | (2006.01) |
| G01F 15/18 | (2006.01) |

(52) U.S. Cl.
CPC .......... G01F 15/0755 (2013.01); G01F 1/662 (2013.01); G01F 1/667 (2013.01); G01F 15/18 (2013.01)

(58) Field of Classification Search
CPC ... G01F 1/66; G01K 1/14; G01K 1/16; G01K 13/02
See application file for complete search history.

(56) References Cited

U.S. PATENT DOCUMENTS

| | | | |
|---|---|---|---|
| 8,136,409 B2 * | 3/2012 | Pflum | G01F 15/063 73/861.08 |
| 9,671,263 B2 | 6/2017 | Otsu et al. | |
| 9,671,264 B2 | 6/2017 | Kashima | |
| 9,696,195 B2 | 7/2017 | Ishikawa et al. | |
| 10,190,896 B2 | 1/2019 | Makino et al. | |
| 10,203,234 B2 | 2/2019 | Ishikawa et al. | |
| 2015/0377691 A1 * | 12/2015 | Ceglia | G01F 1/66 73/1.16 |
| 2017/0102253 A1 * | 4/2017 | Ye | G01F 1/662 |
| 2017/0343397 A1 * | 11/2017 | Ye | G01F 1/662 |
| 2019/0011303 A1 | 1/2019 | Hashimoto et al. | |
| 2019/0242737 A1 * | 8/2019 | Chiken | G01F 25/0007 |

FOREIGN PATENT DOCUMENTS

| | | |
|---|---|---|
| JP | 2004-347352 A | 12/2004 |
| JP | 2007-298401 A | 11/2007 |

OTHER PUBLICATIONS

U.S. Appl. No. 16/268,510, filed Feb. 6, 2019 (92 pages).
U.S. Appl. No. 16/268,512, filed Feb. 6, 2019 (87 pages).
U.S. Appl. No. 16/268,513, filed Feb. 6, 2019 (88 pages).

* cited by examiner

Primary Examiner — Jewel V Dowtin
(74) Attorney, Agent, or Firm — Kilyk & Bowersox, PLLC

(57) ABSTRACT

To provide a flow meter capable of easily acquiring, with a simple configuration, an integrated value of a flow rate in every flow of fluid intermittently flowing in a pipe. A flow-rate measuring section 302 measures a flow rate of fluid flowing in a pipe. A value of the flow rate integrated from a point in time when the integration of the flow rate is started to a point in time when the integration of the flow rate is stopped is acquired as an integrated value. A reset section 306 resets the integrated value from a point in time when the integrated value is acquired to a point in time when the next first switching is determined.

11 Claims, 11 Drawing Sheets

FLOW METER

CROSS-REFERENCE TO RELATED APPLICATIONS

The present application claims foreign priority based on Japanese Patent Application No. 2018-047215, filed Mar. 14, 2018, the contents of which is incorporated herein by reference.

BACKGROUND OF THE INVENTION

1. Field of the Invention

The present invention relates to a flow meter that measures a flow rate of fluid flowing in a pipe.

2. Description of Related Art

A flow meter is used to measure a flow rate of fluid flowing in a pipe. As an example of such a flow meter, for example, in a flow sensor described in JP-A-2004-347352 (Patent Literature 1), a value of a present flow rate is detected as an instantaneous flow rate value and an integrated value of a flow rate from a predetermined time before the present to the present is detected as an integrated flow rate value.

The detected instantaneous flow rate value and the detected integrated flow rate value are respectively displayed on a display. The integrated flow rate value is reset by a user operating a manual adjustment button provided in the flow sensor.

SUMMARY OF THE INVENTION

There is a dispenser that discharges liquid such as an adhesive or a releasing agent by a fixed amount at a time. When the flow sensor described in Patent Literature 1 is applied to the dispenser, by detecting an integrated flow rate value of the discharged liquid every time the liquid is discharged from the dispenser, it is possible to acquire a discharge amount of the liquid every time the liquid is intermittently discharged from the dispenser.

If the discharge amount of the liquid can be grasped every time the liquid is discharged from the dispenser, it is possible to more accurately manage an operation state of the dispenser. In this case, a user needs to perform operation for resetting the integrated flow rate value (hereinafter referred to as reset operation) every time the liquid is discharged by the dispenser. However, depending on a discharge time, a discharge cycle, and the like of the liquid by the dispenser, the user cannot accurately grasp a discharge state of the liquid in the dispenser. In this case, it is difficult for the user to appropriately perform the reset operation of the flow sensor.

As a method for resetting the integrated flow rate value in the flow sensor, there is a method of inputting a reset signal to the flow sensor from the outside of the flow sensor instead of the reset operation by the user (see, for example, JP-A-2007-298401 (Patent Literature 2)). However, when this method is used, it is necessary to separately prepare a signal generator for generating the reset signal in synchronization with the discharge of the dispenser. Therefore, a configuration for measuring a discharge amount of the dispenser is complicated.

An object of the present invention is to provide a flow meter capable of easily acquiring, with a simple configuration, an integrated value of a flow rate in every flow of fluid intermittently flowing in a pipe.

(1) A flow meter according to the present invention includes: a flow-rate measuring section configured to measure a flow rate of fluid flowing in a pipe; a switching determining section configured to determine first switching from a stationary state in which the fluid in the pipe is stationary to a flowing state in which the fluid in the pipe is flowing and determine second switching from the flowing state to the stationary state; a flow-rate integrating section configured to integrate the flow rate measured by the flow-rate measuring section; an integration control section configured to cause the flow-rate integrating section to start the integration of the flow rate in response to the determination of the first switching by the switching determining section and cause the flow-rate integrating section to stop the integration of the flow rate in response to the determination of the second switching by the switching determining section after the determination of the first switching; an acquiring section configured to acquire, as an integrated value, a value of the flow rate integrated by the flow-rate integrating section from a point in time when the integration of the flow rate is started in response to the determination of the first switching to a point in time when the integration of the flow rate is stopped in response to the determination of the second switching; an output section configured to output information concerning the integrated value acquired by the acquiring section; and a reset section configured to reset the integrated value integrated by the flow-rate integrating section from a point in time when the integrated value is acquired by the acquiring section to a point in time when next first switching is determined by the switching determining section.

In the flow meter, the integration of the flow rate is started when the first switching is determined. Thereafter, integration of the flow rate is stopped when the second switching is determined. The integrated value from the point in time when the integration of the flow rate is started to the point in time when the integration of the flow rate is stopped is acquired. The information concerning the acquired integration value is output. The integrated value integrated by the flow-rate integrating section is reset from the point in time when the integrated value is acquired to the point in time when the next first switching is determined.

Consequently a user does not need to perform complicated operation in order to acquire an integrated value of a flow rate in every flow of fluid intermittently flowing in the pipe. Specifically, the user does not need to perform operation for starting integration, stopping the integration, and resetting an integrated value every time the fluid intermittently flowing in the pipe is switched from the stationary state to the flowing state. The user does not need to separately prepare a component for starting integration, stopping the integration, and resetting an integrated value. Therefore, it is possible to easily acquire, with a simple configuration, an integrated value of a flow rate in every flow of the fluid intermittently flowing in the pipe.

(2) The switching determining section may determine the first switching when the flow rate measured by the flow-rate measuring section exceeds a predetermined first flow rate threshold from a value equal to or smaller than the predetermined first flow rate threshold and determine the second switching when the flow rate measured by the flow-rate measuring section decreases to a value equal to or smaller than a predetermined second flow rate threshold from a value larger than the predetermined second flow rate threshold. Consequently, erroneous detection of the first switching and the second switching due to the influence of noise, disturbance, or the like is prevented.

(3) The flow meter may further include: a first allowable-range setting section configured to set an allowable range of the integrated value acquired by the acquiring section; and a first integrated-value determining section configured to determine whether the integrated value acquired by the acquiring section is within the allowable range of the integrated value set by the first allowable-range setting section. The output section may output a determination result by the first integrated-value determining section as the information concerning the integrated value.

In this case, a determination result based on the integrated value of the fluid flowing in the pipe can be used as a control signal to an external apparatus of the flow meter. Therefore, convenience of the flow meter is improved.

(4) The flow meter may further include a first operation section operated by a user in order to set the allowable range of the integrated value. The first allowable-range setting section may cause the flow-rate integrating section to start the integration of the flow rate when the operation of the first operation section is started, cause the flow-rate integrating section to stop the integration of the flow rate when the operation of the first operation section is ended, and set the allowable range of the integrated value on the basis of a value of the flow rate integrated from a point in time when the operation of the first operation section is started to a point in time when the operation of the first operation section is ended.

In this case, the allowable range of the integrated value can be easily set on the basis of an actual flow rate of the fluid flowing in the pipe.

(5) The flow meter may further include a first accepting section configured to accept a first total amount acquisition command to measure a total amount of the fluid flowing in the pipe in a set time set in advance. When the first total amount acquisition command is accepted by the first accepting section, the integration control section may cause the flow-rate integrating section to start the integration of the flow rate in response to the determination of the first switching by the switching determining section and cause the flow-rate integrating section to stop the integration of the flow rate at a point in time when the set time elapses from a point in time when the first switching is determined. When the first total amount acquisition command is accepted by the first accepting section, the acquiring section may acquire, as a total amount value, a value of the flow rate integrated by the flow-rate integrating section from the point in time when the integration of the flow rate is started in response to the determination of the first switching to the point in time when the set time elapses. When the first total amount acquisition command is accepted by the first accepting section, the output section may output information concerning the total amount value acquired by the acquiring section.

(6) The flow meter may further include: a second allowable-range setting section configured to set, when the first total amount acquisition command is accepted by the first accepting section, an allowable range of the total amount value acquired by the acquiring section; and a second integrated-value determining section configured to determine, when the first total amount acquisition command is accepted by the first accepting section, whether the total amount value acquired by the acquiring section is within the allowable range of the total amount value set by the second allowable-range setting section. The output section may output, when the first total amount acquisition command is accepted by the first accepting section, a determination result by the second integrated-value determining section as the information concerning the total amount.

In this case, a determination result based on the total amount value of the fluid flowing in the pipe in the set time can be used as a control signal to the external apparatus of the flow meter. Therefore, convenience of the flow meter is further improved.

(7) The flow meter may further include a second operation section operated by a user in order to set the allowable range of the total amount value and the set time. When the first total amount acquisition command is accepted by the first accepting section, the second allowable-range setting section may cause the flow-rate integrating section to start the integration of the flow rate when the operation of the second operation section is started, cause the flow-rate integrating section to stop the integration of the flow rate when the operation of the second operation section is ended, set the allowable range of the total amount value on the basis of a value of the flow rate integrated from a point in time when the operation of the second operation section is started to a point in time when the operation of the second operation section is ended, and set, as the set time, a time from the point in time when the first switching is determined by the switching determining section after the operation of the second operation section is started to the point in time when the operation of the second operation section is ended.

In this case, the allowable range of the total amount value and the set time can be easily set on the basis of an actual flow rate of the fluid flowing in the pipe.

(8) The flowmeter may further include a second accepting section configured to accept a second total amount acquisition command to measure a total amount of the fluid flowing in the pipe while the switching determining section repeatedly determines the first switching and the second switching a number of times set in advance. When the second total amount acquisition command is accepted by the second accepting section, the integration control section may cause the flow-rate integrating section to start the integration of the flow rate in response to the determination of the first switching by the switching determining section and cause the flow-rate integrating section to stop the integration of the flow rate in response to the set number of times of repeated determination of the first switching and the second switching from a point in time when the first switching is determined. When the second total amount acquisition command is accepted by the second accepting section, the acquiring section may acquire, as a total amount, a value of the flow rate integrated by the flow-rate integrating section from the point in time when the integration of the flow rate is started in response to the determination of the first switching to the point in time when the integration of the flow rate is stopped in response to the set number of times of the repeated determination of the first switching and the second switching. When the second total amount acquisition command is accepted by the second accepting section, the output section may output information concerning the total amount value acquired by the acquiring section. Consequently, convenience of the flow meter is improved.

(9) The flow meter may further include: a display section; a storing section configured to store one or a plurality of integrated values acquired by the acquiring section from a predetermined time before present to the present; and a display control section configured to cause the display section to display a maximum and a minimum of the one or the plurality of integrated values stored in the storing section.

In this case, the user can easily recognize the maximum and the minimum of the integrated values acquired from the predetermined time before the present to the present.

(10) The flow-rate measuring section may include: a pair of ultrasonic elements configured to be capable of transmitting and receiving an ultrasonic wave; and a clamp member configured to fix the pair of ultrasonic elements to the pipe to transmit the ultrasonic wave between the pair of ultrasonic elements through the fluid in the pipe.

The flow meter is a clamp-on type ultrasonic flow sensor. In this case, the flow meter can be easily attached to an existing pipe. Since a pressure loss is not caused in the fluid flowing in the pipe, an integrated value can be highly accurately acquired concerning fluid having high viscosity.

(11) The flow meter may further include a determination invalidating section configured to invalidate the determination by the switching determining section for a predetermined invalidation time from a point in time when the second switching is determined by the switching determining section.

In this case, when the first switching is determined according to occurrence of overshoot immediately after the point in time when the second switching is determined, the determination is invalidated. Consequently, the integrated value is prevented from being reset at unintended timing.

According to the present invention, it is possible to easily acquire, with a simple configuration, an integrated value of a flow rate in every flow of fluid intermittently flowing in a pipe.

DESCRIPTION OF EMBODIMENTS

A flow meter according to an embodiment of the present invention is explained below with reference to the drawings.

In the following explanation, a clamp-on type ultrasonic flow sensor (hereinafter abbreviated as flow sensor) is explained as an example of the flow meter.

[1] Basic Configuration of the Flow Sensor

Figure 1:
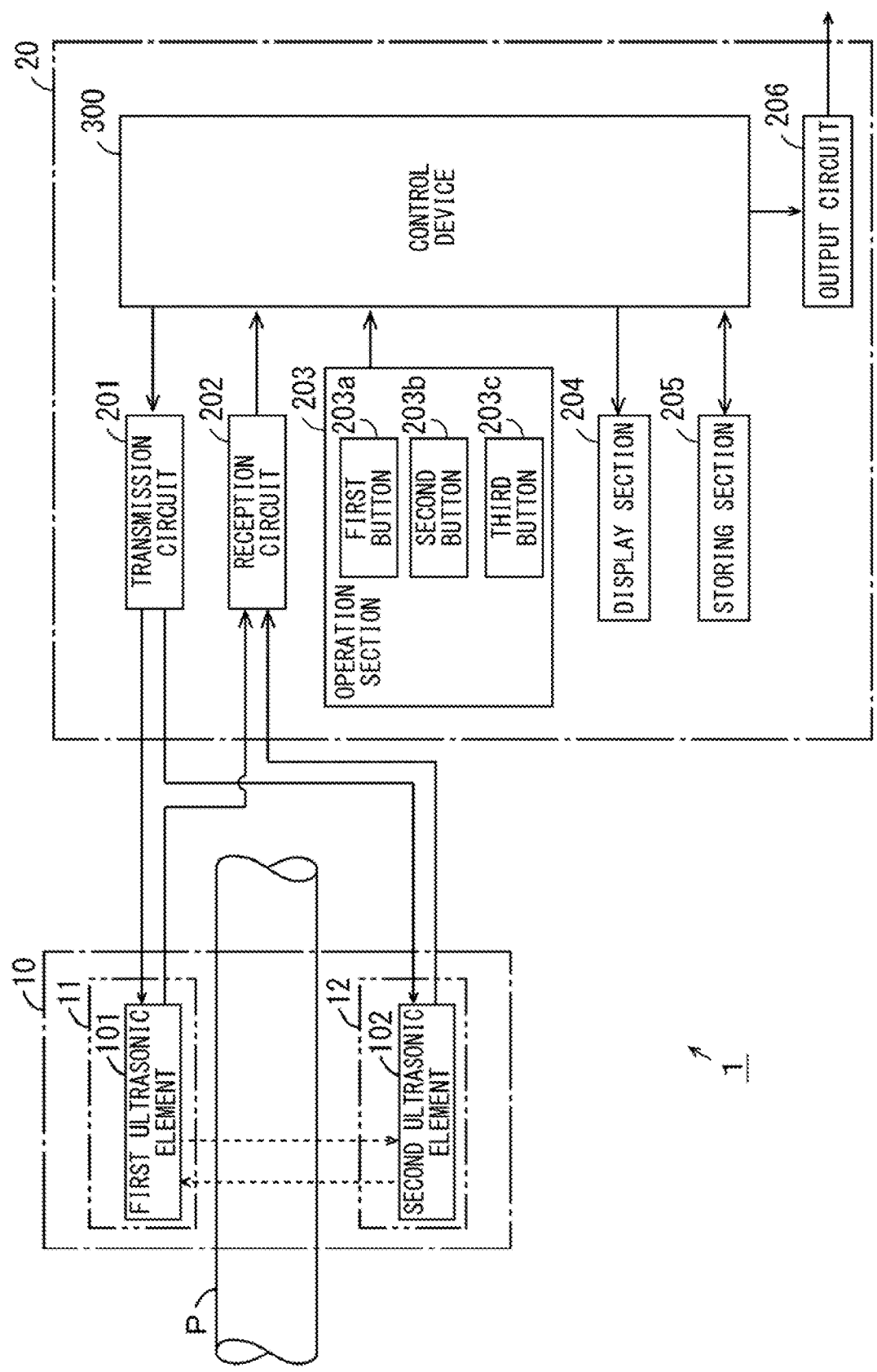
FIG. 1 is a block diagram for explaining a basic configuration of a flow sensor according to an embodiment of the present invention.

FIG. 1 is a block diagram for explaining a basic configuration of the flow sensor according to the embodiment of the present invention. As shown in FIG. 1, a flow sensor 1 according to this embodiment includes a head section 10 and a main body section 20. The head section 10 and the main body section 20 are connected by a not-shown cable The head section 10 includes a first head section 11 including a first ultrasonic element 101 and a second head section 12 including a second ultrasonic element 102. The head section 10 is attached to, for example, a pipe P configuring a dispenser. The pipe P to which the head section 10 is attached is connected to a discharge port of the dispenser for discharging liquid. Liquid such as an adhesive or a releasing agent intermittently flows in the pipe P, whereby the liquid is intermittently discharged from the discharge port of the dispenser.

In a state in which the head section 10 is attached to the pipe P, the first and second ultrasonic elements 101 and 102 are fixed to the pipe P by a clamp member CL (FIG. 2) explained below such that an ultrasonic wave is transmitted through the pipe P and the liquid in the pipe P between the first and second ultrasonic elements 101 and 102.

The main body section 20 includes a transmission circuit 201, a reception circuit 202, an operation section 203, a display section 204, a storing section 205, an output circuit 206, and a control device 300. The transmission circuit 201 generates, on the basis of control by the control device 300, driving signals for respectively driving the first and second ultrasonic elements 101 and 102. The transmission circuit 201 generates the driving signal for driving the first ultrasonic element 101, whereby an ultrasonic wave is transmitted from the first ultrasonic element 101 in response to the driving signal. The transmission circuit 201 generates the driving signal for driving the second ultrasonic element 102, whereby an ultrasonic wave is transmitted from the second ultrasonic element 102 in response to the driving signal.

The transmission circuit 201 may be configured by two driving-signal generation circuits respectively corresponding to the first and second ultrasonic elements 101 and 102. Alternatively, the transmission circuit 201 may be configured by one driving-signal generation circuit and a switching circuit. In this case, the switching circuit switches and outputs a driving signal generated by the driving-signal generation circuit to the first and second ultrasonic elements 101 and 102.

In each of the first and second ultrasonic elements 101 and 102, an ultrasonic wave is received, whereby an ultrasonic signal corresponding to the received ultrasonic wave is output. The reception circuit 202 performs predetermined signal processing (amplification processing, analog/digital conversion processing, and the like) on the ultrasonic signal output from the first ultrasonic element 101 and gives the ultrasonic signal after the signal processing to the control device 300. The reception circuit 202 performs the predetermined signal processing on the ultrasonic signal output from the second ultrasonic element 102 and gives the ultrasonic signal after the signal processing to the control device 300.

The reception circuit 202 may be configured by two signal processing circuits respectively corresponding to the first and second ultrasonic elements 101 and 102. Alternatively, the reception circuit 202 may be configured by one signal processing circuit and a switching circuit. In this case, the switching circuit switches a connection state of the first and second ultrasonic elements 101 and 102 and the signal processing circuit such that ultrasonic signals output from the first and second ultrasonic elements 101 and 102 are input to the signal processing circuit.

The control device 300 is configured by, for example, a CPU (central processing unit) and a memory. The control device 300 controls the transmission circuit 201 and measures a flow rate of liquid flowing in the pipe P on the basis of the processed ultrasonic signal given from the reception circuit 202. The flow rate is an amount of the liquid passing through the pipe P in a unit time.

The control device 300 determines on the basis of the measured flow rate whether a state inside the pipe P is switched from a stationary state in which the liquid is stationary to a flowing state in which the liquid is flowing. The control device 300 determines on the basis of the measured flow rate whether the state inside the pipe P is switched from the flowing state to the stationary state.

The control device 300 acquires, on the basis of the measured flow rate and a determination result of switching, an integrated value of a flow rate in every flow of the liquid intermittently flowing in the pipe P. Further, the control device 300 determines whether the acquired integrated value is within a predetermined allowable range and gives a determination signal indicating a result of the determination to the output circuit 206. Details of the operation of the control device 300 are explained below.

The operation section 203 includes a plurality of operation buttons. A user can input various kinds of information used for measurement of a flow rate by operating the operation section 203. The various kinds of information used for the measurement of a flow rate include the material of the pipe P attached to the head section 10, the inner diameter of the pipe P, the outer diameter of the pipe P, velocity of an ultrasonic wave in the liquid, an incident angle of the ultrasonic wave on the liquid, and a flow rate correction coefficient explained below. The user can set the allowable range described above by operating the operation section 203. The plurality of operation buttons of the operation section 203 include a first button 203a, a second button 203b, and a third button 203c. Details of the first to third buttons 203a to 203c are explained below.

The display section 204 includes, for example, a segment display or a dot matrix display and displays a flow rate value, an integrated value, and the like of the liquid flowing in the pipe P on the basis of the control by the control device 300. The storing section 205 is configured by a nonvolatile memory or a hard disk drive and stores various kinds of information for measuring a flow rate of the liquid flowing in the pipe P. The storing section 205 stores an integrated value of a flow rate acquired in every flow of the liquid in the pipe P by the control device 300.

The output circuit 206 outputs the determination signal given from the control device 300 to an external apparatus (not shown in FIG. 1) of the flow sensor 1 as information concerning an integrated value acquired by measurement. The output apparatus is, for example, a personal computer or a programmable logic controller. In this case, the determination signal can be used as a signal for switching an ON state and an OFF state of the external apparatus (an ON/OFF signal). Consequently, the flow sensor 1 can be used as a flow switch. Therefore, convenience of the flow sensor 1 is improved.

[2] Calculating Method for a Flow Rate

Figure 2:
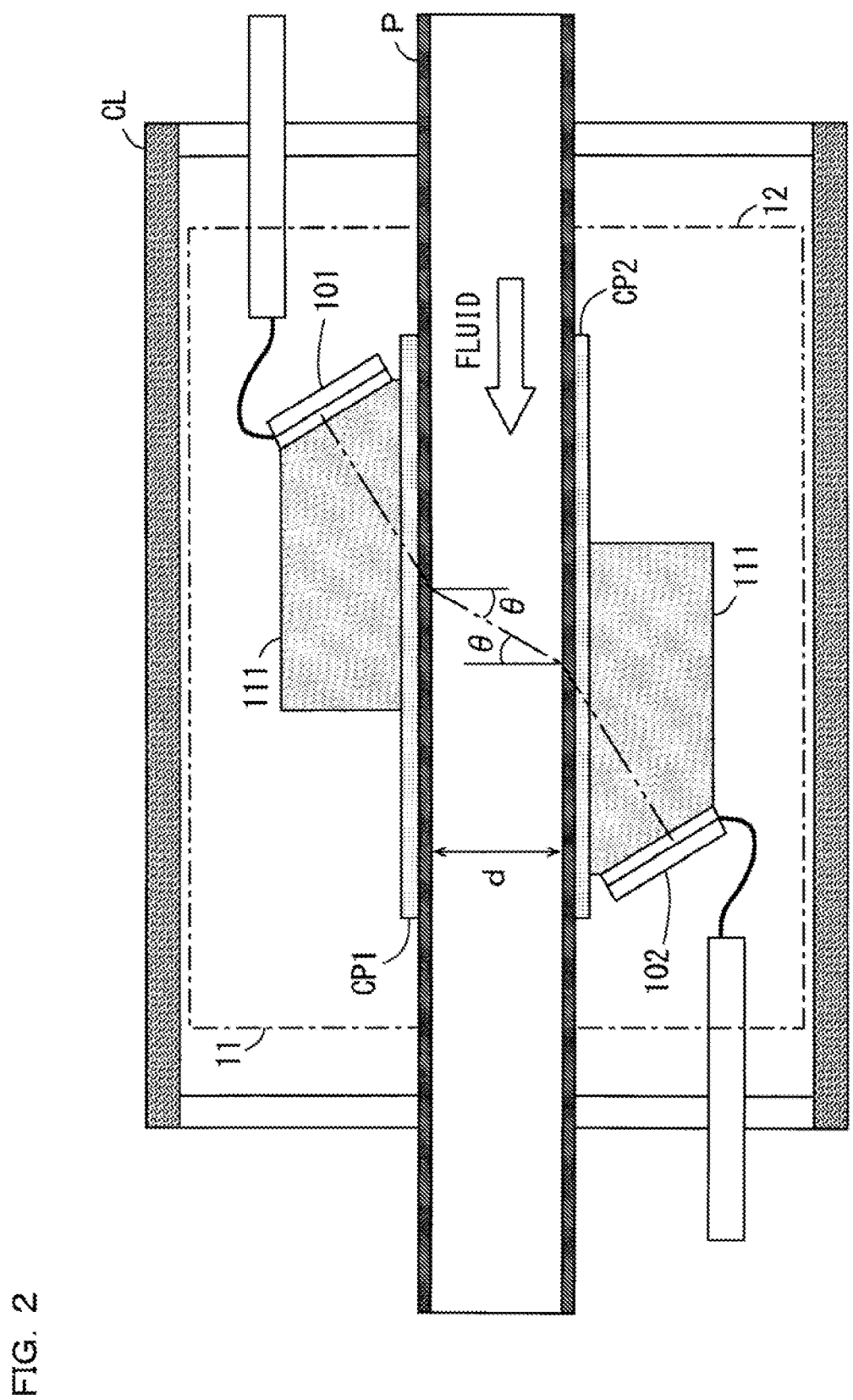
FIG. 2 is a schematic sectional view showing a first ultrasonic element, a second ultrasonic element, and peripheral members thereof for explaining a calculating method for a flow rate in the flow sensor shown in FIG. 1.

FIG. 2 is a schematic sectional view showing the first ultrasonic element 101, the second ultrasonic element 102, and peripheral members thereof for explaining a calculating method for a flow rate in the flow sensor 1 shown in FIG. 1.

As shown in FIG. 2, in the head section 10, a solid elastic couplant CP1 is provided to be in contact with a part of the outer circumferential surface of the pipe P. A solid elastic couplant CP2 is provided to be in contact with another portion of the outer circumferential surface of the pipe P. The elastic couplants CP1 and CP2 are formed of a soft elastic material made of solid polymeric rubber or a solid gel substance.

The first head section 11 includes a wedge material 111 that transmits an ultrasonic wave. The first head section 11 is provided such that the wedge material 111 is in contact with the outer circumferential surface of the elastic couplant CP1. Like the first head section 11, the second head section 12 includes the wedge material 111 that transmits an ultrasonic wave. The second head section 12 is provided such that the wedge material 111 is in contact with the outer circumferential surface of the elastic couplant CP2. The wedge material 111 is formed of a non-metal material having high rigidity and high acoustic transparency.

The first head section 11 and the second head section 12 are fixed to the pipe P by the clamp member CL to clamp the pipe P. The liquid flows in the pipe P, whereby it is possible to transmit and receive an ultrasonic wave between the first ultrasonic element 101 and the second ultrasonic element 102. At this time, the ultrasonic element traverses the pipe P and the liquid in the pipe P obliquely with respect to the axial direction of the pipe P.

The control device 300 shown in FIG. 1 controls the transmission circuit 201 such that an ultrasonic wave is transmitted from the first ultrasonic element 101 to the second ultrasonic element 102 and an ultrasonic signal output from the second ultrasonic element 102 is input to the reception circuit 202. The control device 300 controls the transmission circuit 201 such that an ultrasonic wave is transmitted from the second ultrasonic element 102 to the first ultrasonic element 101 and an ultrasonic signal output from the first ultrasonic element 101 is input to the reception circuit 202. Thereafter, the control device 300 calculates a time difference on the basis of the two ultrasonic signals.

Before measurement of a flow rate, at least the inner diameter of the pipe P, velocity of an ultrasonic wave in the liquid, an incident angle of the ultrasonic wave on the liquid, and a flow rate correction coefficient are set in the flow sensor 1. The flow rate correction coefficient is a coefficient for converting velocity of the liquid having a predetermined distribution in the cross section of the pipe P into average velocity.

In this case, the control device 300 calculates a flow rate Q of the liquid flowing in the pipe P on the basis of, for example, Expression (1) described below. In Expression (1), $\Delta t$ represents a time difference between a first time and a second time calculated in the main body section 20, d represents the inner diameter of the pipe P, $\theta$ represents the incident angle of the ultrasonic wave in the liquid, $V_s$ represents the velocity of the ultrasonic wave in the liquid, and K represents the flow rate correction coefficient.

$$Q = (1/K) \cdot (\pi d V_s^2 / 8 \tan \theta) \cdot \Delta t \qquad (1)$$

[3] Measurement Example of an Integrated Flow Rate in the Flow Sensor 1

The flow sensor 1 measures a flow rate of the liquid flowing in the pipe P in a micro period. In the following explanation, a flow rate measured at each point in time on a time axis is set as an instantaneously measured flow rate and referred to as instantaneous flow rate. A flow rate obtained by integrating an instantaneous flow rate measured from a point in time when the state inside the pipe P is switched from the stationary state to the flowing state to a point in time when the state inside the pipe P is switched to the next stationary state is referred to as integrated flow rate. In this case, the integrated flow rate is an amount of the liquid flowing in the pipe P with one pulsation.

Figure 3:
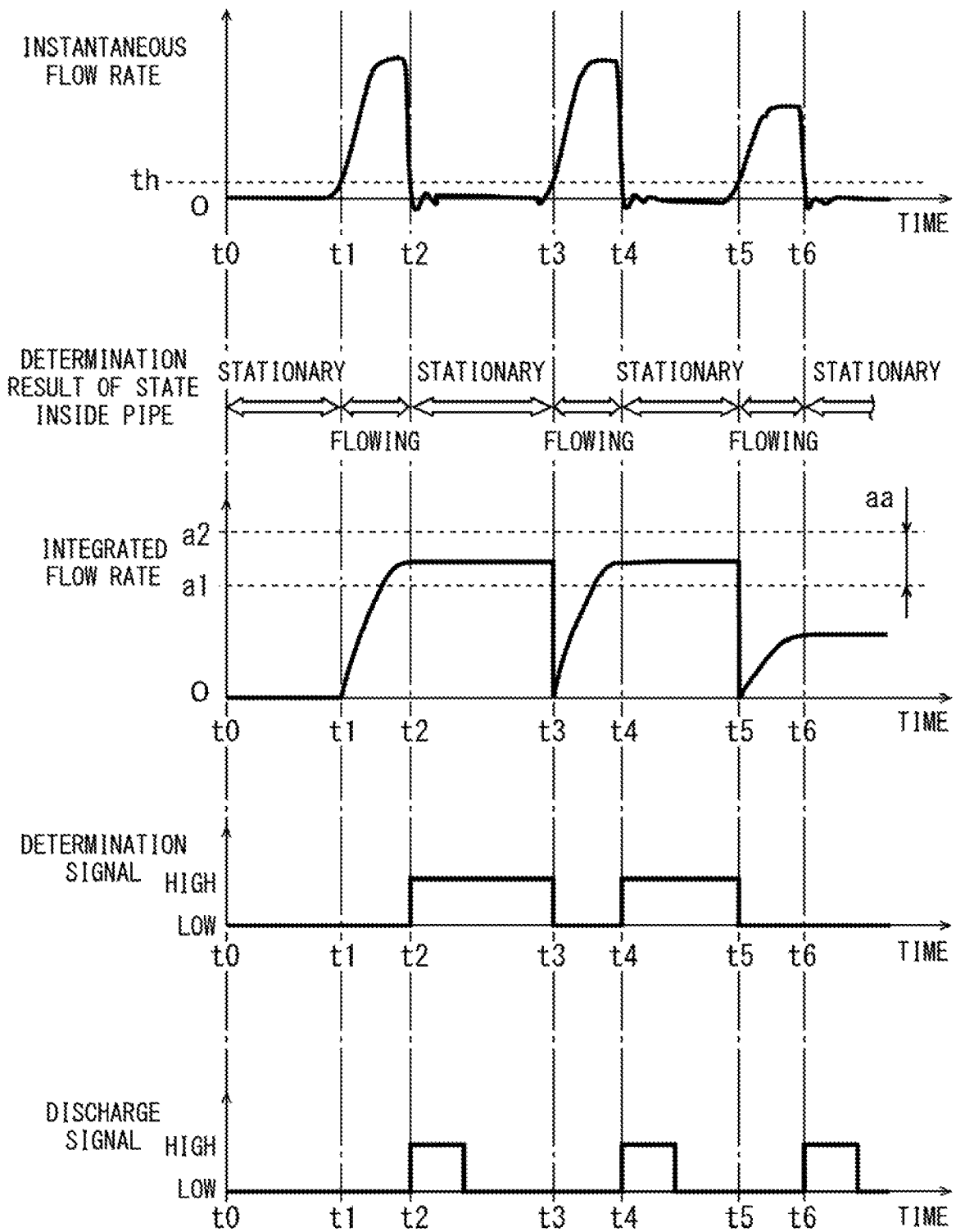
FIG. 3 is a diagram for explaining a specific measurement example of an instantaneous flow rate and an integrated flow rate by the flow sensor.

FIG. 3 is a diagram for explaining a specific measurement example of the instantaneous flow rate and the integrated flow rate by the flow sensor 1. In a first stage of FIG. 3, an example of a temporal change of the instantaneous flow rate measured by the flow sensor 1 is shown. In a second stage of FIG. 3, a state inside the pipe P determined on the basis of the instantaneous flow rate is shown. In a third stage of FIG. 3, an example of a temporal change of the integrated flow rate measured by the flow sensor 1 is shown. Further, in fourth and fifth stages of FIG. 3, examples of a determination signal and a discharge signal are respectively shown. The discharge signal is a signal indicating that the liquid intermittently flows in the pipe P.

In this example, an instantaneous flow rate value and an integrated flow rate value take positive values when the liquid flows from upstream to downstream in the pipe P and takes negative values when the liquid flows (flows back) from downstream to upstream in the pipe P.

When the liquid intermittently flows in the pipe P, the instantaneous flow rate value indicates a value of 0 or substantially 0 when the liquid is stationary. The instantaneous flow rate value increases when the liquid flows from upstream to downstream.

In the flow sensor 1 according to this embodiment, a flow rate threshold th for determining the state inside the pipe P and the switching of the state is set in advance. The threshold th is set considering, for example, noise occurring in an ultrasonic signal and is stored in the storing section 205 shown in FIG. 1. The flow rate threshold th may be set on the basis of operation of the operation section 203 shown in FIG. 1 by the user or may be set by a manufacturer during factory shipment of the flow sensor 1.

The control device 300 shown in FIG. 1 determines that the inside of the pipe P is in the stationary state when the instantaneous flow rate value is equal to or smaller than the flow rate threshold th and determines that the inside of the pipe P is in the flowing state when the instantaneous flow rate value is larger than the flow rate threshold th. By using the flow rate threshold th in this way, the state inside the pipe P and the switching of the state are prevented from being erroneously determined by the influence of noise or the like.

According to the example shown in FIG. 3, it is determined that the inside of the pipe P is in the stationary state in a time when the instantaneous flow rate value is equal to or smaller than the flow rate threshold th, that is, a time from a point in time t0 to a point in time t1, a time from a point in time t1 to a point in time t3, a time from a point in time t4 to a point in time t5, and a time at and after a point in time t6. On the other hand, it is determined that the inside of the pipe P is in the flowing state in a time when the instantaneous flow rate value exceeds the flow rate threshold th, that is, a time between the point in time t1 and the point in time t2, a time between the point in time t3 and the point in time t4, and a time between the point in time t5 and the point in time t6.

Consequently, the switching from the stationary state to the flowing state and the switching from the flowing state to the stationary state are determined. In the following explanation, the switching from the stationary state to the flowing state inside the pipe P is referred to as first switching. The switching from the flowing state to the stationary state inside the pipe P is referred to as second switching.

The control device 300 shown in FIG. 1 starts integration of an instantaneous flow rate at a point in time when the first switching is determined and stops the integration of the instantaneous flow rate at a point in time when the second switching is determined. At the point in time when the first switching is determined, an integrated flow rate integrated up to the point in time is reset.

In the example shown in FIG. 3, the integration of the instantaneous flow rate is started at the point in time t1 when the first switching is determined. Consequently, immediately after the point in time t1, the integrated flow rate steeply rises according to rising of the instantaneous flow rate. Thereafter, the integration of the instantaneous flow rate is stopped at the point in time t2 when the second switching is determined. Consequently, the integrated flow rate is maintained in a value measured at the point in time t2 until the next first switching is determined after the point in time t2.

When the next first switching is determined at the point in time t3, an integrated flow rate value measured up to the point in time t3 is reset and integration of an instantaneous flow rate is started. Thereafter, at the point in time t4 when the second switching is determined, the integration of the instantaneous flow rate is stopped. At the points in time t5 to t6 following the point in time t4, as in the operation at the points in time t3 to t4, reset of an integrated flow rate value, a start of integration of an instantaneous flow rate, and a stop of the integration of the instantaneous flow rate are performed.

In the flow sensor 1 according to this embodiment, a range for determining whether a measured integrated flow rate value is appropriate is set as a first allowable range aa in advance. The first allowable range aa includes a lower limit value a1 and an upper limit value a2. The user sets the first allowable range aa considering, for example, a discharge amount of the liquid discharged once by the dispenser including the pipe P.

The control device 300 shown in FIG. 1 determines whether an integrated flow rate value is within the first allowable range aa at a point in time when the second switching is determined and resets a result of the determination at a point in time when the next switching is determined. During the determination of the integrated flow rate value, the control device 300 generates a high-level determination signal when the integrated flow rate value is within the first allowable range aa and generates a low-level determination signal when the integrated flow rate value is not within the first allowable range aa.

In the example shown in FIG. 3, the integrated flow rate value is within the first allowable range aa at the points in time t2 and t4. Therefore, the determination signal is maintained at the high level at the point in time t2 to the point in time t3 and at the point in time t4 to the point in time t5. On the other hand, the integrated flow rate value is smaller than the lower limit value a1 of the first allowable range aa and is outside the first allowable range aa at the point in time t6. Therefore, the determination signal is maintained at the low level at and after the point in time t6.

The control device 300 shown in FIG. 1 generates the discharge signal. When the second switching is determined, the discharge signal is at the high level for a predetermined fixed time from a point in time of the determination of the second switching and is at the low level after the fixed time.

By using the generated discharge as, for example, a switching signal for switching a lit state and an extinguished state of a light emitting device, it is possible to easily indicate to the user whether the fluid intermittently flows inside the pipe P.

[4] First Tuning Function

Figure 4:
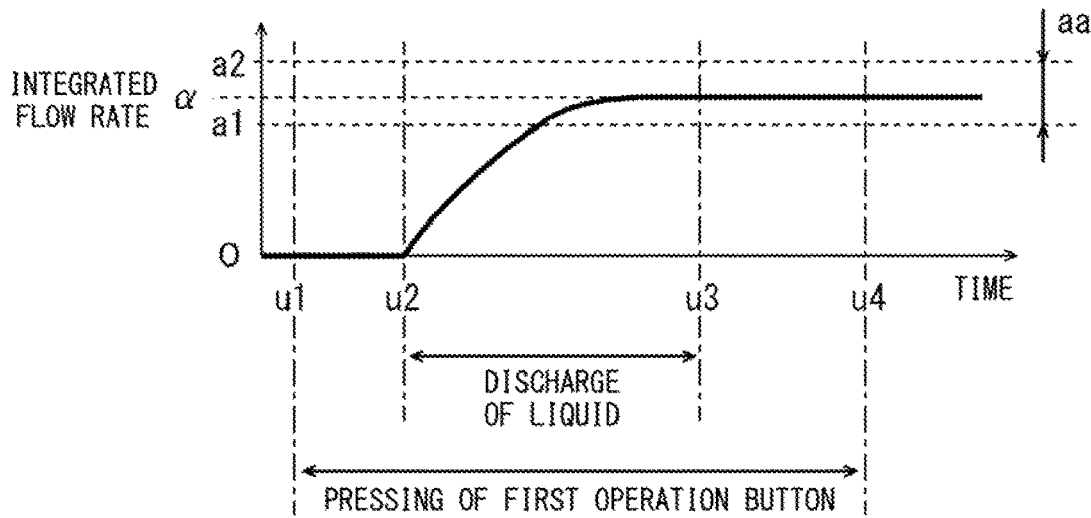
FIG. 4 is a diagram for explaining a first tuning function.

The flow sensor 1 according to this embodiment has a first tuning function as a function of supporting work of the user for setting the first allowable range aa shown in FIG. 3. In the first tuning function, the first button 203a shown in FIG. 1 is used. FIG. 4 is a diagram for explaining the first tuning function. In FIG. 4, an example of a temporal change of an integrated flow rate measured when the first allowable range aa is set is shown.

When setting the first allowable range aa using the first tuning function, first, when the inside of the pipe P is in the stationary state, the user performs operation (long-press operation) for pressing the first button 203a and maintaining a pressed state of the first button 203a for a fixed time. The control device 300 starts integration of an instantaneous flow rate simultaneously with a start of the long-press operation of the first button 203a. In the example shown in FIG. 4, the long-press operation of the first button 203a is started at a point in time u1. Immediately after the point in time u1, an integrated flow rate value is maintained at 0 because the inside of the pipe P is in the stationary state.

Subsequently, the user operates the dispenser while maintaining the pressed state of the first button 203a to thereby cause the dispenser to discharge the fluid by an amount for flowing in the pipe P once during actual measurement. In the example shown in FIG. 4, the discharge of the liquid from the dispenser is started at a point in time u2. The discharge of the liquid from the dispenser is ended at a point in time u3.

In this case, at the point in time t1 to the point in time t2, the integrated flow rate value is maintained at 0 because the inside of the pipe P is in the stationary state. Thereafter, the inside of the pipe P changes to the flowing state from the point in time u2 to the point in time u3, whereby the integrated flowrate value increases.

Subsequently, the user ends the long-press operation of the first button 203a at a point in time after the point in time when the discharge of the liquid by the dispenser is ended. In the example shown in FIG. 4, the long-press operation of the first button 203a is ended at a point in time u4. In this case, at the point in time u3 to the point in time u4, since the inside of the pipe P is in the stationary state, an integrated flow rate value is maintained at a value at the point in time u3.

According to the series of operation explained above, the first allowable range aa is set on the basis of an integrated flow rate value α at a point in time when the operation of the first button 203a by the user is ended. The lower limit value a1 and the upper limit value a2 are determined to have, for example, width of several percent (e.g., 10%) of the magnitude of the integrated flow rate value α centering on the integrated flow rate value α. These values are stored in the storing section 205 shown in FIG. 1, whereby the first allowable range aa is set.

With the first tuning function, the user can easily set the first allowable range aa of the integrated flow rate value on the basis of an actual flow rate of the liquid flowing in the pipe P.

[5] Total-Amount-by-Time Measuring Function

The flow sensor 1 according to this embodiment has a total-amount-by-time measuring function for measuring, as a total amount, a total of an amount of the liquid flowing in the pipe P in a set time set in advance by the user. During the measurement of the total amount by the total-amount-by-time measuring function, as in the example shown in FIG. 3, an instantaneous flow rate is measured in a micro period. The first switching and the second switching are determined on the basis of the measured instantaneous flow rate. The total amount of the liquid flowing in the pipe P in the set time is calculated by integrating the instantaneous flow rate measured in the set time.

Figure 5:
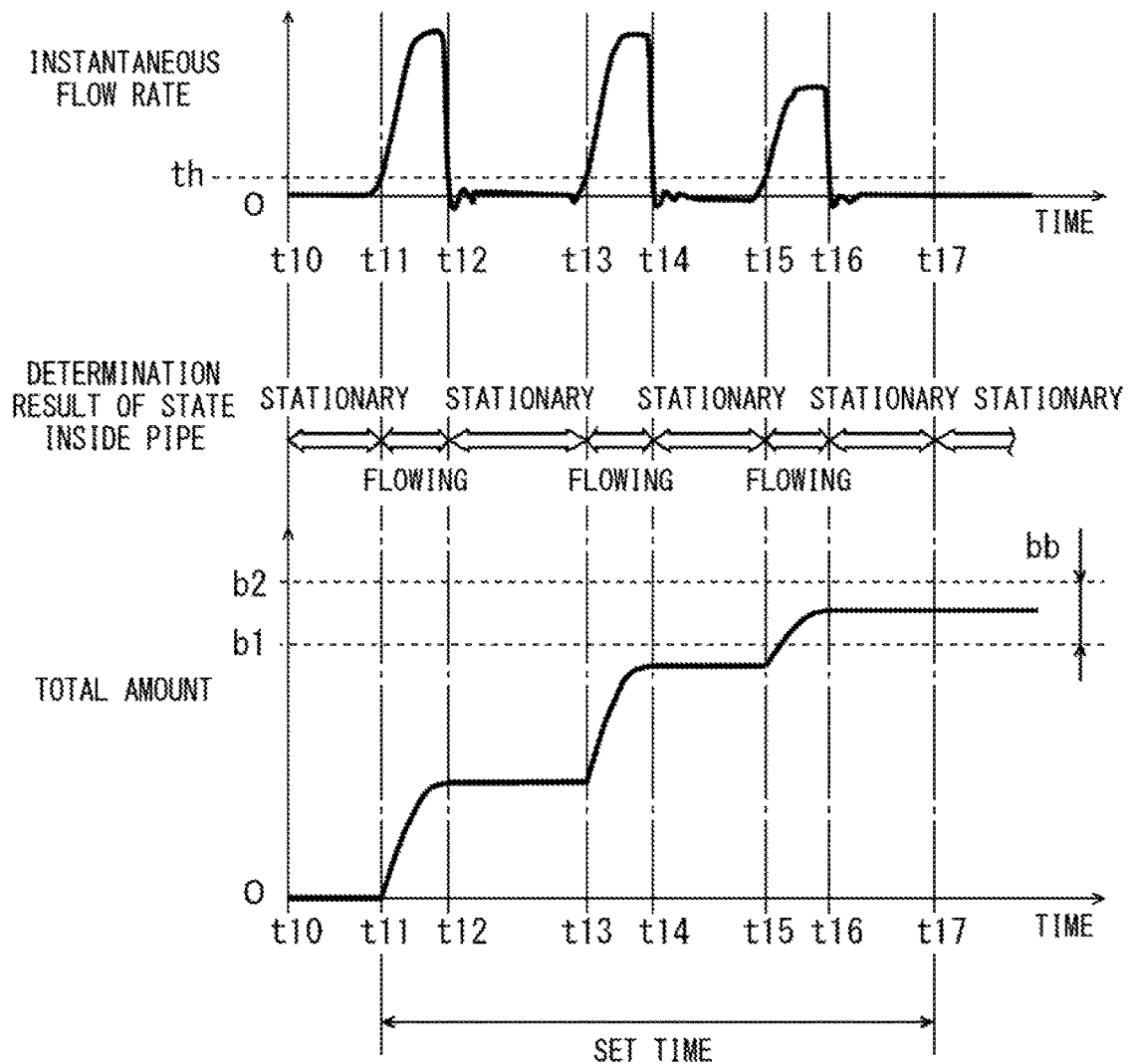
FIG. 5 is a diagram for explaining a total-amount-by-time measuring function.

FIG. 5 is a diagram for explaining the total-amount-by-time measuring function. In a first stage of FIG. 5, an example of a temporal change of an instantaneous flow rate measured by the flow sensor 1 is shown. In a second stage of FIG. 5, a state inside the pipe P determined on the basis of the instantaneous flow rate is shown. In a third stage of FIG. 5, an example of a temporal change of a total amount measured by the total-amount-by-time measuring function is shown.

In the example shown in FIG. 5, the instantaneous flow rate value is equal to or smaller than the flow rate threshold th in a time from a point in time t10 to a point in time t11, a time from a point in time t12 to a point in time t13, a time from a point in time t14 to a point in time t15, and a time at and after a point in time t16. The instantaneous flow rate value exceeds the flow rate threshold th in other times. Consequently, the first switching is determined at the points in time t11, t13, and t15 and the second switching is determined at the points in time t12, t14, and t16.

When performing the measurement of a total amount by the total-amount-by-time measuring function, first, the user presses the second button 203b shown in FIG. 1 when the inside of the pipe P is in the stationary state. This pressing is normal pressing operation rather than the long-press operation. The control device 300 starts integration of the instantaneous flow rate simultaneously with the pressing of the second button 203b. In the example shown in FIG. 5, the second button 203b is pressed at the point in time t10. At the point in time t10 to the point in time t11, the total amount is maintained at 0 because the inside of the pipe P is in the stationary state.

When the first switching is determined at the point in time t11, the control device 300 starts measurement of time. Specifically, the control device 300 measures a time from a point in time when the first switching is determined first after the measurement of a total amount is started until the set time elapses.

In the example shown in FIG. 15, a time from the point in time t11 to a point in time t17 is the set time. In this case, the integration of the instantaneous flow rate is continued from the point in time t11 to the point in time t17. The integration of the instantaneous flow rate is stopped at the point in time t17. Consequently, a total amount measured at the point in time t17 is a total of the liquid flowing in the pipe P at the point in time t11 to the point in time t12, at the point in time t13 to the point in time 14, and at the point in time t15 to the point in time t16. In this way, a total amount of the liquid flowing in the pipe P in the set time is measured. A measured total amount value is reset, for example, at the next measurement start time of a total amount. The measured total amount value may be reset when a predetermined time elapses after completion of the measurement of a total amount.

In the flow sensor 1 according to this embodiment, a range for determining whether the measured total amount value is appropriate is set as a second allowable range bb in advance. The second allowable range bb includes a lower limit value b1 and an upper limit value b2. The user sets the second allowable range bb considering, for example, a total of a discharge amount of the liquid per set time of the dispenser including the pipe P.

Consequently, as in the example shown in FIG. 3, even during the measurement of a total amount, it is determined whether a measured total amount is within the second allowable range bb. A determination signal indicating a result of the determination is generated. Further, for example, the generated determination signal is output to the outside of the flow sensor 1 from the output circuit 206 shown in FIG. 1.

[6] Second Tuning Function

Figure 6:
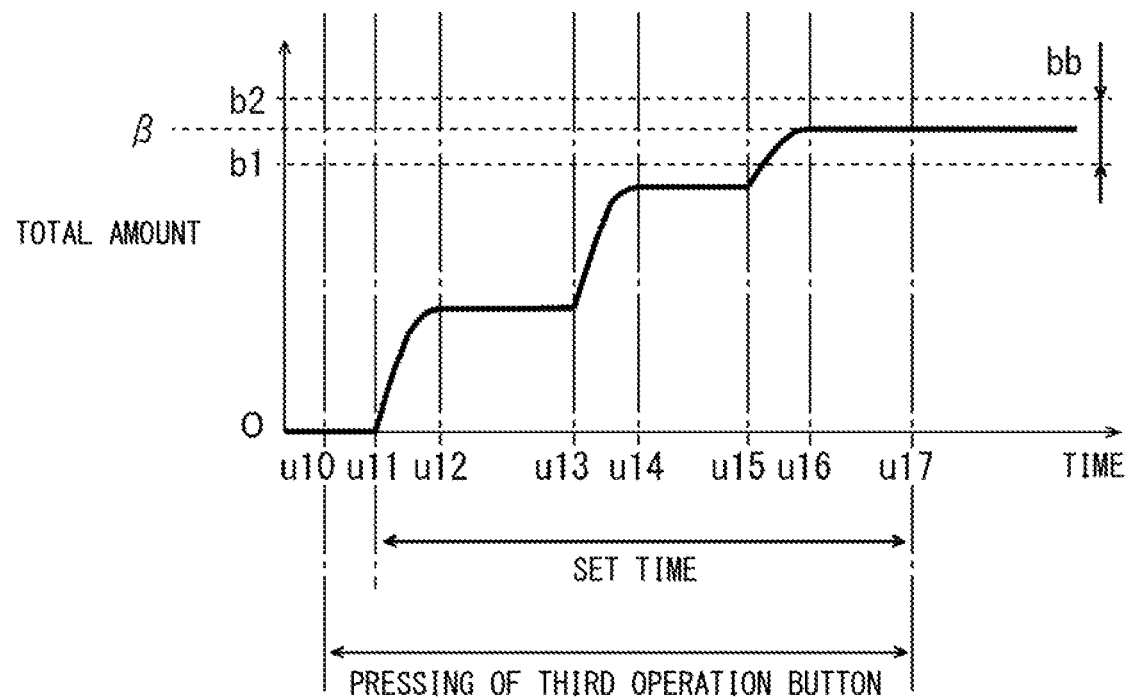
FIG. 6 is a diagram for explaining a second tuning function.

The flow sensor 1 according to this embodiment has a second tuning function as a function of supporting work of the user for setting the second allowable range bb shown in FIG. 5 and a set time. In the second tuning function, the third button 203c shown in FIG. 1 is used. FIG. 6 is a diagram for explaining the second tuning function. In FIG. 6, an example of a temporal change of a total amount measured when the second allowable range bb is set by the second tuning function is shown.

When setting the second allowable range bb using the second tuning function, first, the user starts the long-press operation of the third button 203c when the inside of the pipe P is in the stationary state. The control device 300 starts integration of an instantaneous flow rate simultaneously with a start of the long-press operation of the first button 203a. In the example shown in FIG. 6, the long-press operation of the third button 203c is started at a point in time u10. Immediately after the point in time u10, a total amount value is 0 because the inside of the pipe P is in the stationary state.

Subsequently, the user operates the dispenser while maintaining the pressed state of the third button 203c to thereby cause the dispenser to operate in the same manner as operation during actual measurement. At this time, for example, the dispenser performs a discharging operation of the liquid intermittently in a fixed period. In the example shown in FIG. 6, the liquid is discharged from the dispenser at a point in time u11 to a point in time u12, at a point in time u13 to a point in time u14, and at a point in time u15 to a point in time u16. Consequently, the total amount value intermittently increases from the point in time u11 to the point in time u16.

Thereafter, the user ends the long-press operation of the third button 203c at a desired point in time. In the example shown in FIG. 6, the long-press operation of the third button 203c is ended at a point in time u17. In this case, at the point in time u16 to the point in time u17, since the inside of the pipe P is in the stationary state, the total amount value is maintained at a value at the point in time u16.

According to the series of operation explained above, a time from the point in time u11 when the total amount value rises first to the point in time u17 when the pressing operation of the third button 203c is released is set as a set time. The second allowable range bb is set on the basis of a total amount value β measured at a point in time when the pressing operation of the third button 203c by the user is released. For example, the lower limit value b1 and the upper limit value b2 are determined to have width of several percent (e.g., 10%) of the magnitude of the total amount value β centering on the total amount value β. These values are stored in the storing section 205 shown in FIG. 1, whereby the second allowable range bb is set.

With the second tuning function, the user can easily set the second allowable range bb of the total amount value and the set time on the basis of an actual flow rate of the liquid flowing in the pipe P.

[7] Functional Configuration of the Flow Sensor 1

Figure 7:
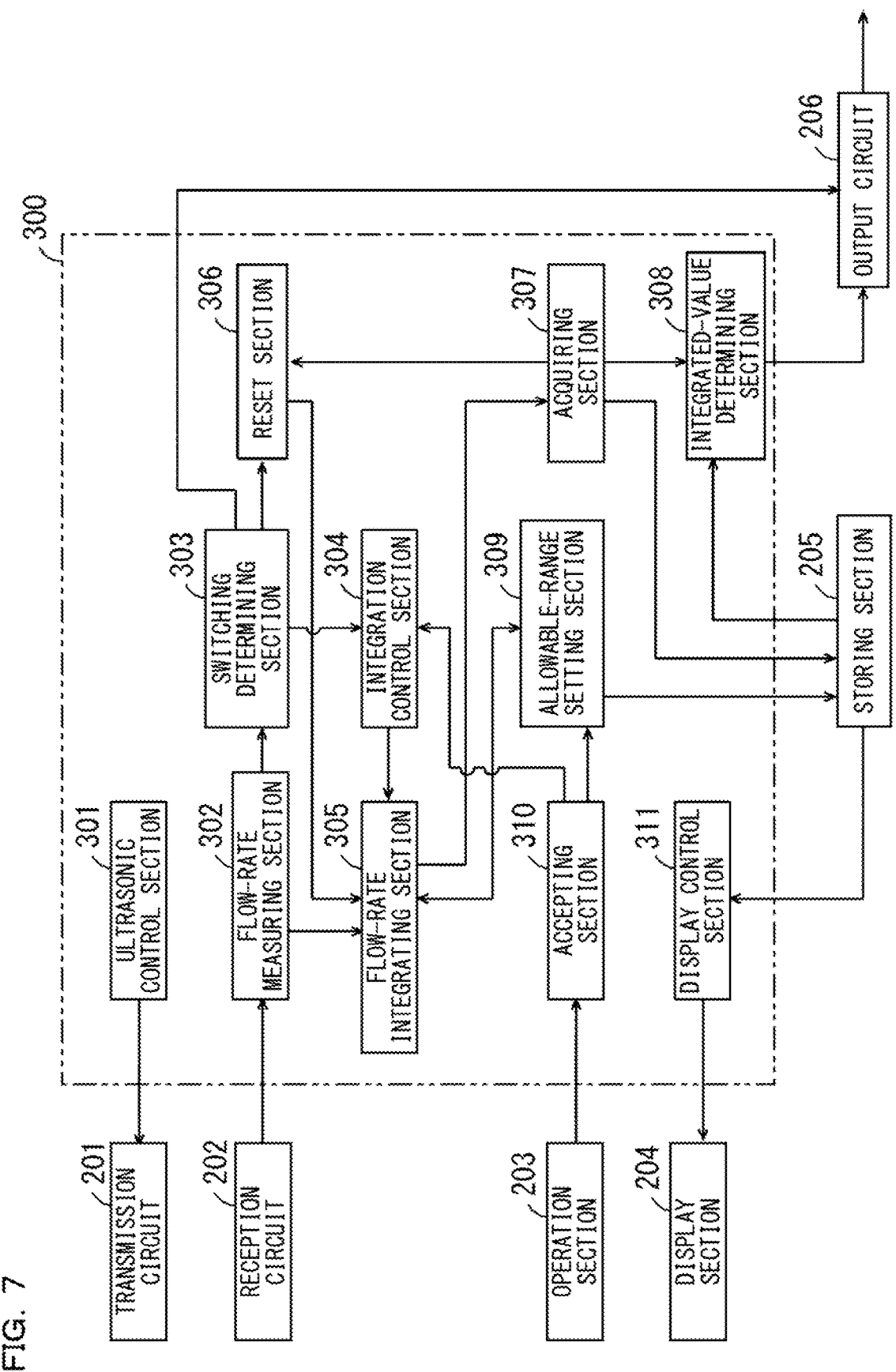
FIG. 7 is a block diagram showing a functional configuration of a control device shown in FIG. 1.

FIG. 7 is a block diagram showing a functional configuration of the control device 300 shown in FIG. 1. As shown in FIG. 7, the control device 300 includes an ultrasonic control section 301, a flow-rate measuring section 302, a switching determining section 303, an integration control section 304, a flow-rate integrating section 305, a reset section 306, an acquiring section 307, an integrated-value determining section 308, an allowable-range setting section 309, an accepting section 310, and a display control section 311. These components are realized by the CPU of the control device 300 executing a program for flow rate measurement stored in the memory in the control device 300 or the storing section 205. A part or all of the plurality of components included in the control device 300 may be realized by hardware such as an electronic circuit.

The ultrasonic control section 301 controls the transmission circuit 201 such that ultrasonic waves are alternately transmitted from the first and second ultrasonic elements 101 and 102 shown in FIG. 1. The flow-rate measuring section 302 measures an instantaneous flow rate on the basis of the ultrasonic signals after the signal processing given from the first and second ultrasonic elements 101 and 102 through the reception circuit 202, the various kinds of information stored in the storing section 205, and Expression (1) described above.

The switching determining section 303 determines the first switching from the stationary state to the flowing state on the basis of the instantaneous flow rate measured by the flow-rate measuring section 302 and the flow rate threshold th. For example, the switching determining section 303 determines the first switching when the measured instantaneous flow rate exceeds the flow rate threshold th from a value equal to or smaller than the flow rate threshold th. The switching determining section 303 determines the second switching from the flowing state to the stationary state on the basis of the instantaneous flow rate calculated by the flow-rate measuring section 302 and the flow rate threshold th. For example, the switching determining section 303 determines the second switching when the measured instantaneous flow rate changes to a value equal to or smaller than the flow rate threshold th from a value larger than the flow rate threshold th. The switching determining section 303 gives a result of the determination to the integration control section 304. The switching determining section 303 gives a signal indicating the determination of the second switching to the output circuit 206 as a discharge signal. In this case, the output circuit 206 outputs the given discharge signal to the external apparatus of the flow sensor 1. The discharge signal may not be generated.

The flow-rate integrating section 305 integrates the instantaneous flow rate value obtained by the measurement of the flow-rate measuring section 302. During the measurement of an integrated flow rate value, the integration control section 304 causes the flow-rate integrating section 305 to start integration of the instantaneous flow rate in response to the determination of the first switching by the switching determining section 303. The integration control section 304 causes the flow-rate integrating section 305 to stop the integration of the instantaneous flow rate in response to the determination of the second switching after the determination of the first switching. During the measurement of a total amount value by the total-amount-by-time measuring function, the integration control section 304 causes the flow-rate integrating section 305 to start the integration of the instantaneous flow rate in response to the determination of the first switching by the switching determining section 303. The integration control section 304 causes the flow-rate integrating section 305 to stop the integration of the instantaneous flow rate at a point in time when the set time elapses from a point in time of the determination of the first switching. The integration control section 304 has a timer function. Consequently, the integration control section 304 performs measurement of a set time using the timer function during the measurement of a total amount.

During the measurement of an integrated flow rate value, the acquiring section 307 acquires, as an integrated flow rate value, an integrated value of the instantaneous flow rate integrated from a point in time when the integration of the instantaneous flow rate is started until a point in time when the integration of the instantaneous flow rate is stopped. During the measurement of a total amount value by the total-amount-by-time measuring function, the acquiring section 307 acquires, as a total amount value, an integrated value of the instantaneous flow rate integrated from the point in time when the integration of the instantaneous flow rate is started until the point in time when the set time set in advance elapses. The acquiring section 307 gives the acquired flow rate integrated value or the acquired total amount value to the integrated-value determining section 308 and the storing section 205. In this case, the storing section 205 stores the flow rate integrated value or the total amount value acquired by the acquiring section 307.

In response to the acquisition of the flow rate integrated value or the total amount value in the acquiring section 307, the reset section 306 resets the integrated flow rate value or the total amount value integrated by the flow-rate integrating section 305 at a point in time when the next first switching is determined by the switching determining section 303. The reset section 306 may perform the reset at a point in time when a predetermined time elapses from a point in time when the flow rate integrated value or the total amount value is acquired in addition to performing the reset at the point in time when the next first switching is determined.

The integrated-value determining section 308 determines whether the flow rate integrated value acquired by the acquiring section 307 is within the first allowable range aa stored in the storing section 205. Alternatively, the integrated-value determining section 308 determines whether the total amount value acquired by the acquiring section 307 is within the second allowable range bb stored in the storing section 205. Then, the integrated-value determining section 308 generates a determination signal indicating a result of the determination and gives the generated determination signal to the output circuit 206. The output circuit 206 outputs the determination signal given from the integrated-value determining section 308 to the external apparatus of the flow sensor 1.

The acquiring section 307 may give the acquired flow rate integrated value or the acquired total amount value to the output circuit 206. The output circuit 206 may output a signal indicating the flow rate integrated value or the total amount value given from the acquiring section 307 to the external apparatus of the flow sensor 1. In this case, a form and a dynamic range of a signal that should be output may be able to be set on the basis of the operation of the operation section 203 by the user.

The accepting section 310 accepts a setting command for the first allowable range aa set by using the first tuning function on the basis of operation of the first button 203a shown in FIG. 1 by the user and gives a control signal corresponding to an operation state of the first button 203a to the allowable-range setting section 309. In this case, for example, the allowable-range setting section 309 causes the flow-rate integrating section 305 to start the integration of the instantaneous flow rate when the long-press operation of the first button 203a is started and stops the integration of the instantaneous flow rate by the flow-rate integrating section 305 when the long-press operation is ended. Thereafter, the allowable-range setting section 309 determines the first allowable range aa on the basis of an integrated value and causes the storing section 205 to store the determined first allowable range aa. Consequently, the first allowable range aa is set.

The accepting section 310 accepts a command for total amount measurement by the total-amount-by-time measuring function on the basis of operation of the second button 203b shown in FIG. 1 by the user. In this case, processing for acquiring a total amount value is performed in the integration control section 304, the flow-rate integrating section 305, and the acquiring section 307 as explained above.

Further, the accepting section 310 accepts a setting command for the second allowable range bb and the set time set by using the second tuning function on the basis of operation of the third button 203c shown in FIG. 1 by the user and gives a control signal corresponding to an operation state of the third button 203c to the allowable-range setting section 309. In this case, for example, the allowable-range setting section 309 causes the flow-rate integrating section 305 to start the integration of the instantaneous flow rate when the long-press operation of the third button 203c is started. The allowable-range setting section 309 causes the flow-rate integrating section 305 to stop the integration of the instantaneous flow rate when the long-press operation is ended. Further, the allowable-range setting section 309 determines the second allowable range bb on the basis of a value integrated from a point in time when the operation of the third button 203c is started until a point in time when the long-press operation is ended and causes the storing section 205 to store the determined second allowable range bb. The allowable-range setting section 309 causes the storing section 205 to store, as the set time, a time from a point in time when the first switching is determined after the long-press operation of the third button 203c is started until the point in time when the long-press operation is ended. Consequently, the second allowable range bb and the set time are set.

The display control section 311 causes the display section 204 to display the various kinds of information stored in the storing section 205, the flow rate integrated value acquired by the acquiring section 307, the total amount value acquired by the acquiring section 307, and the like. The display control section 311 may cause the display section 204 to display a maximum and a minimum of one or a plurality of flow rate integrated values acquired from a predetermined time before the present to the present. In this case, the user can easily recognize the maximum and the minimum of the flow rate integrated values acquired from the predetermined time before the present to the present.

[8] Measuring Processing for an Integrated Flow Rate

Figure 8:
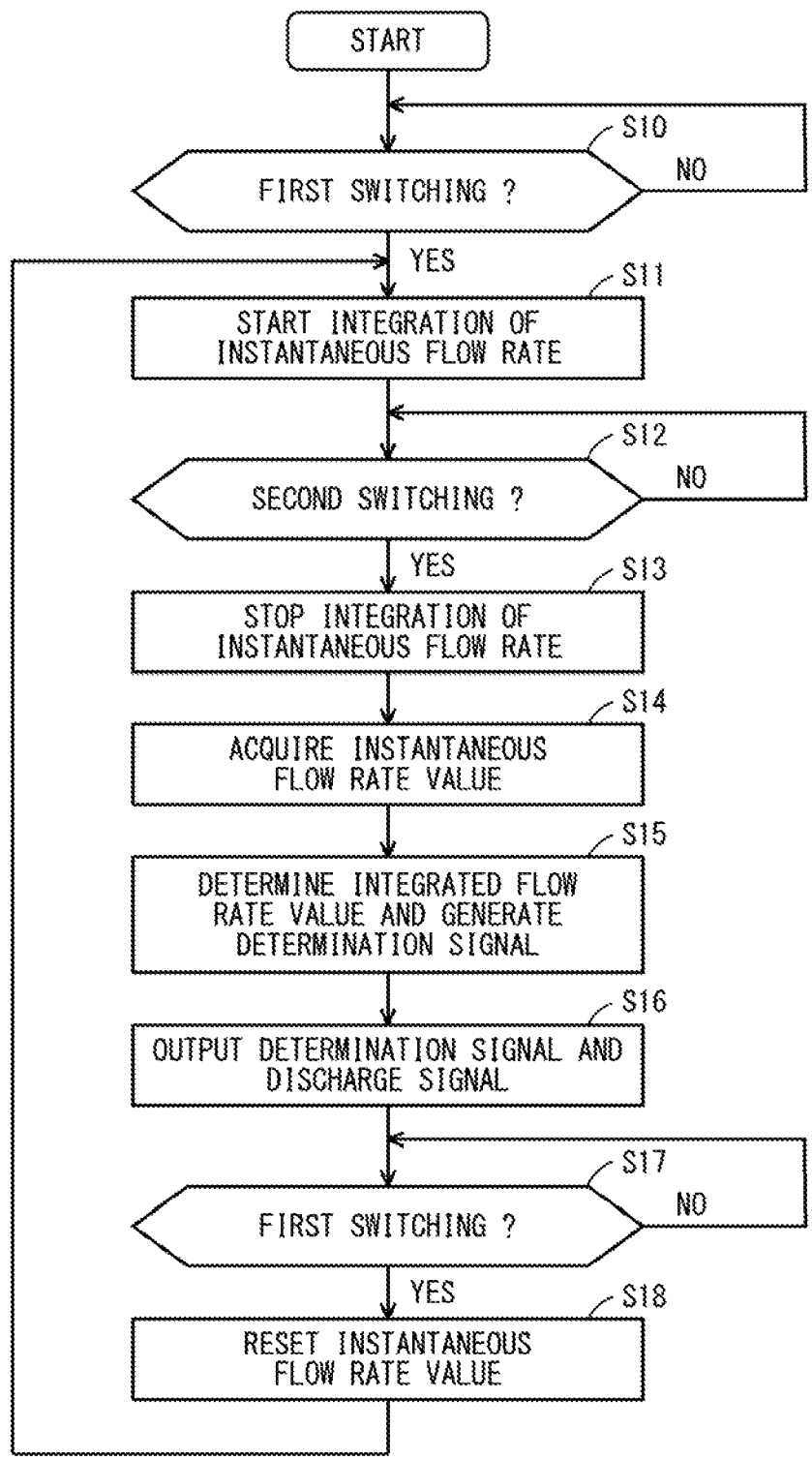
FIG. 8 is a flowchart showing a flow of a series of processing executed by functional sections shown in FIG. 7 during measurement of an integrated flow rate.

FIG. 8 is a flowchart showing a flow of a series of processing executed by the functional sections shown in FIG. 7 during measurement of an integrated flow rate. The processing shown in FIG. 8 is started, for example, when a power supply of the flow sensor 1 is turned on. During the processing explained below, an instantaneous flow rate is measured in a micro period by the ultrasonic control section 301 and the flow-rate measuring section 302 shown in FIG. 7. In an initial state, the first allowable range aa is stored in advance in the storing section 205.

First, the switching determining section 303 shown in FIG. 7 determines the first switching on the basis of the instantaneous flow rate measured by the flow-rate measuring section 302 and the flow rate threshold th (step S10). When the first switching is not determined, the switching determining section 303 repeats the processing in step S10. On the other hand, when the first switching is determined, the integration control section 304 shown in FIG. 7 causes the flow-rate integrating section 305 to start integration of the instantaneous flow rate in response to the determination (step S11).

Subsequently, the switching determining section 303 determines the second switching on the basis of the instantaneous flow rate measured by the flow-rate measuring section 302 and the flow rate threshold th (step S12). When the second switching is not determined, the switching determining section 303 repeats the processing in step S12. On the other hand, when the second switching is determined, the integration control section 304 causes the flow-rate integrating section 305 to stop the integration of the instantaneous flow rate in response to the determination (step S13). At this time, the switching determining section 303 generates a discharge signal.

Subsequently, the acquiring section 307 shown in FIG. 7 acquires, as an integrated flow rate value, an integrated value of the instantaneous flow rate integrated from a point in time when the integration of the instantaneous flow rate is started by the processing in the immediately preceding step S11 to a point in time when the integration of the instantaneous flow rate is stopped by the processing in the immediately preceding step S13 (step S14).

Subsequently, the integrated-value determining section 308 shown in FIG. 7 determines whether the flow rate integrated value acquired by the acquiring section 307 in the processing in the immediately preceding step S14 is within the first allowable range aa stored in the storing section 205 and generates a determination signal indicating a result of the determination (step S15). Thereafter, the integrated-value determining section 308 and the switching determining section 303 give the generated determination signal and the discharge signal to the output circuit 206 shown in FIG. 7 to thereby cause the output circuit 206 to output the determination signal and the discharge signal to the outside of the flow sensor 1 (step S16).

Subsequently, as in the processing in step S10, the switching determining section 303 shown in FIG. 7 determines the first switching (step S17). When the first switching is not determined, the switching determining section 303 repeats the processing in step S17. On the other hand, when the first switching is determined, the reset section 306 shown in FIG. 7 resets the integrated flow rate value integrated by the flow-rate integrating section 305 in response to the determination of the first switching in step S17 (step S18). Thereafter, the integration control section 304 shown in FIG. 7 returns to the processing in step S11.

The series of processing ends, for example, when the power supply of the flow sensor 1 is switched from the ON state to the OFF state. Alternatively, the series of processing ends, for example, when the use of the total-amount-by-time measuring function, the first tuning function, or the second tuning function is commanded by the operation of the operation section 203 by the user.

Figure 9:
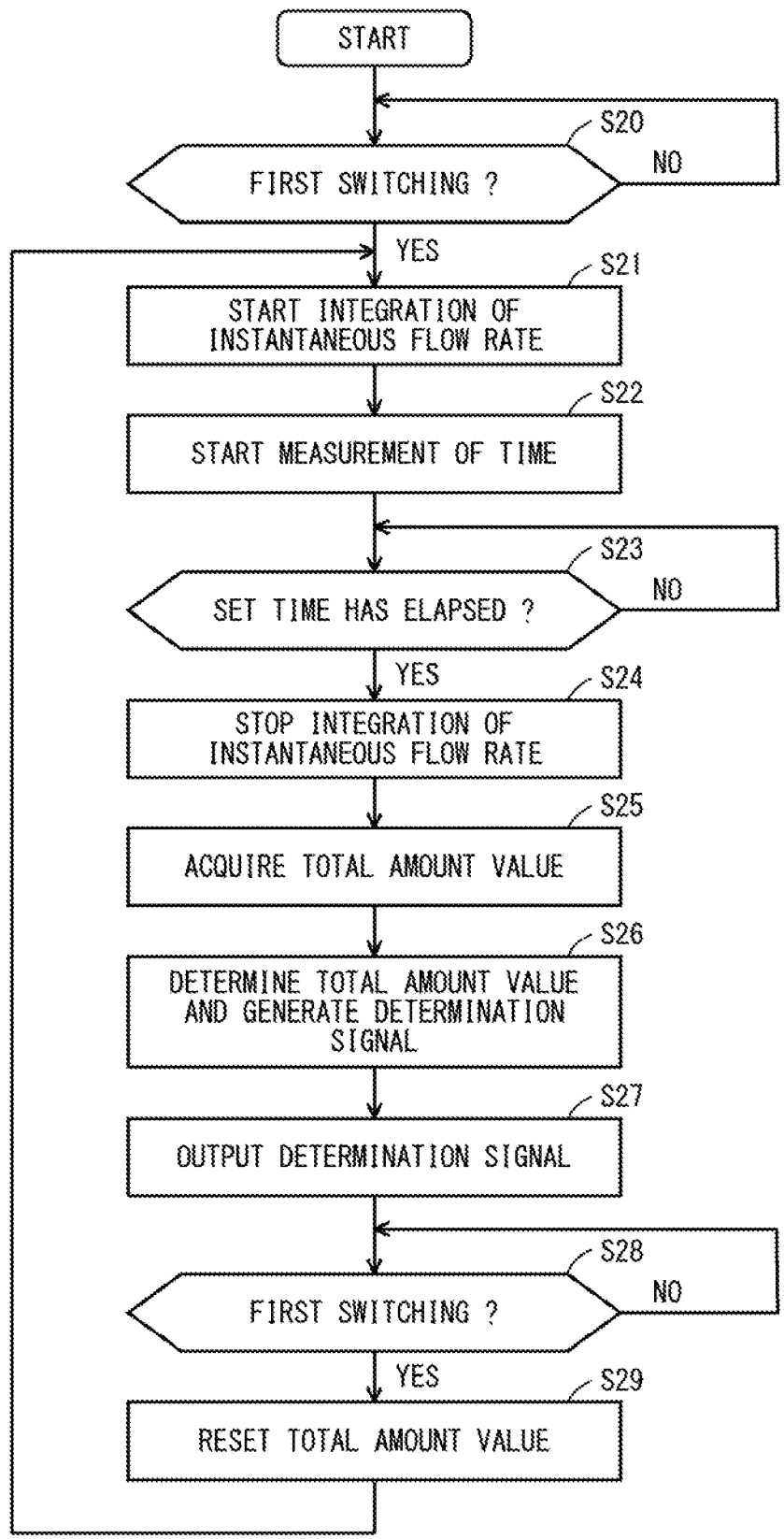
FIG. 9 is a flowchart showing a flow of a series of processing executed by the functional sections shown in FIG. 7 during measurement of a total amount by the total-amount-by-time measuring function.

[9] Measuring Processing for a Total Amount by the Total-Amount-by-Time Measuring Function FIG. 9 is a flowchart showing a flow of a series of processing executed by the functional sections shown in FIG. 7 during the measurement of a total amount by the total-amount-by-time measuring function. The processing shown in FIG. 9 is started, for example, when the second button 203b shown in FIG. 1 is operated during the execution of the processing shown in FIG. 8. During the processing explained below, an instantaneous flow rate is measured in a micro period by the ultrasonic control section 301 and the flow-rate measuring section 302 shown in FIG. 7. In the initial state, the second allowable range bb and the set time are stored in advance in the storing section 205.

First, the switching determining section 303 shown in FIG. 7 determines the first switching on the basis of the instantaneous flow rate measured by the flow-rate measuring section 302 and the flow rate threshold th (step S20). When the first switching is not determined, the switching determining section 303 repeats the processing in step S20. On the other hand, when the first switching is determined, the integration control section 304 shown in FIG. 7 causes the flow-rate integrating section 305 to start integration of the instantaneous flow rate in response to the determination (step S21). The integration control section 304 starts, using the timer function of the integration control section 304, measurement of a time from a point in time when the first switching is determined (step S22).

Subsequently, the integration control section 304 determines on the basis of the set time stored in the storing section 205 and the measured time whether the set time has elapsed from the point in time when the first switched is determined (step S23). When the set time has not elapsed, the integration control section 304 repeats the processing in step S23. On the other hand, when the set time has elapsed, the integration control section 304 stops the integration of the instantaneous flow rate by the flow-rate integrating section 305 (step S24).

Subsequently, the acquiring section 307 shown in FIG. 7 acquires, as a total amount value, an integrated value of the instantaneous flow rate integrated from a point in time when the integration of the instantaneous flow rate is started by the processing in the immediately preceding step S21 to a point in time when the integration of the instantaneous flow rate is stopped by the processing in the immediately preceding step S24 (step S25).

Subsequently, the integrated-value determining section 308 shown in FIG. 7 determines whether the total amount value acquired by the acquiring section 307 in the processing in the immediately preceding step S25 is within the second allowable range bb stored in the storing section 205 and generates a determination signal indicating a result of the determination (step S26). Thereafter, the integrated-value determining section 308 gives the generated determination signal to the output circuit 206 shown in FIG. 7 to thereby cause the output circuit 206 to output the determination signal to the outside of the flow sensor 1 (step S27).

Subsequently, as in the processing in step S20, the switching determining section 303 shown in FIG. 7 determines the first switching (step S28). When the first switching is not determined, the switching determining section 303 repeats the processing in step S28. On the other hand, when the first switching is determined, the reset section 306 shown in FIG.

7 resets the total amount value integrated by the flow-rate integrating section 305 in response to the determination of the first switching in step S28 (step S29). Thereafter, the integration control section 304 shown in FIG. 7 returns to the processing in step S21.

The series of processing ends, for example, when the power supply of the flow sensor 1 is switched from the ON state to the OFF state. Alternatively, the series of processing ends, for example, when measurement of an integrated flow rate value is commanded by the operation of the operation section 203 by the user. Alternatively, the series of processing ends, for example, when use of the first tuning function or the second tuning function is commanded by the operation of the operation section 203 by the user.

[10] Effects (a) In the flow sensor 1 according to this embodiment, during the measurement of an integrated flow rate value, the integration of the instantaneous flow rate is started when the first switching is determined. The integration of the instantaneous flow rate is stopped when the second switching is determined. An integrated flow rate value from a point in time when the integration of the instantaneous flow rate is started to a point in time when the integration of the instantaneous flow rate is stopped. It is determined whether the acquired integrated flow rate value is within the first allowable range aa. A determination signal indicating a result of the determination is output to the outside of the flow sensor 1. The integrated flow rate value is reset from a point in time when the integrated flow rate value is acquired to a point in time when the next first switching is determined.

Consequently, the user does not need to perform complicated work for performing the start of the integration of the instantaneous flow rate, the stop of the integration of the instantaneous flow rate, and the reset of the integrated flow rate value every time the liquid intermittently flowing in the pipe P is switched from the stationary state to the flowing state. With the flow sensor 1, it is unnecessary to separately prepare a component such as a signal generator for performing the start of the integration of the instantaneous flow rate, the stop of the integration of the instantaneous flow rate, and the reset of the integrated flow rate value. Therefore, it is possible to easily acquire, with a simple configuration, an integrated flow rate value for every flow of the liquid intermittently flowing in the P.

(b) In the flow sensor 1 according to this embodiment, it is possible to acquire a total amount of the liquid flowing in the pipe P in the set time by using the total-amount-by-time measuring function. Consequently, for example, by setting the set time in advance considering the number of times of discharge of the liquid by the dispenser, it is possible to easily acquire, as a total amount, a total of amounts of the liquid discharged a plurality of times. Therefore, convenience of the flow sensor 1 is improved.

(c) The flow sensor 1 is the clamp-on type ultrasonic flow sensor. Therefore, the flow sensor 1 can be easily attached to the existing pipe P. In the clamp-on type ultrasonic flow sensor, it is unnecessary to provide a sensor or the like on the inside of the pipe P. It is also unnecessary to separately form a channel of the liquid for flow rate measurement. Therefore, a pressure loss is prevented from occurring in the liquid flowing in the pipe P. Therefore, it is possible to highly accurately acquire an integrated flow rate value and a total amount concerning liquid having high viscosity.

[11] Other Embodiments (a) In the flow sensor 1 according to the embodiment, a total amount of the liquid flowing in the pipe P in the set time is acquired by the total-amount-by-time measuring function. However, the present invention is not limited to this. The flow sensor 1 may have, in addition to the total-amount-by-time measuring function, a total-amount-by-number-of-times measuring function for measuring a total amount of the liquid flowing in the pipe P while the first switching and the second switching is repeatedly determined a set number of times set in advance.

In this case, the accepting section 310 shown in FIG. 7 accepts a command for total amount measurement by the total-amount-by-number-of-times measuring function on the basis of, for example, the operation of the operation section 203 by the user. When the accepting section 310 accepts the command for the total amount measurement by the total-amount-by-number-of-times measuring function, the integration control section 304 shown in FIG. 7 sets a counter in the memory in the control device 300. Further, the integrated control section 304 causes the flow-rate integrating section 305 to start integration of the instantaneous flow rate in response to the determination of the first switching by the switching determining section 303 and increments a value of the counter in response to the determination of the first switching and the second switching. Thereafter, when the value of the counter reaches a set number of times, the integration control section 304 causes the flow-rate integrating section 305 to stop the integration of the instantaneous flow rate. Therefore, the acquiring section 307 shown in FIG. 7 acquires, as a total amount value, an integrated value of the instantaneous flow rate at a point in time when the integration of the instantaneous flow rate is stopped.

When the accepting section 310 accepts the command for the total amount measurement by the total-amount-by-number-of-times measuring function, in response to the acquisition of the total amount value in the acquiring section 307, the reset section 306 resets the total amount value at a point in time when the next first switching is determined by the switching determining section 303 and resets the value of the counter set by the integration control section 304.

During the total amount measurement by the total-amount-by-number-of-times measuring function in this example, as during the total amount measurement by the total-amount-by-number-of-times measuring function described above, an allowable range corresponding to an acquired total amount is set in advance as a third allowable range. In this case, the integrated-value determining section 308 determines whether the total amount value acquired by the acquiring section 307 is within the third allowable range stored in the storing section 205, generates a determination signal indicating a result of the determination, and gives the generated determination signal to the output circuit 206. The output circuit 206 outputs the determination signal given from the integrated-value determining section 308 to the external apparatus of the flow sensor 1 as information concerning the total amount value acquired by the measurement.

Figure 10:
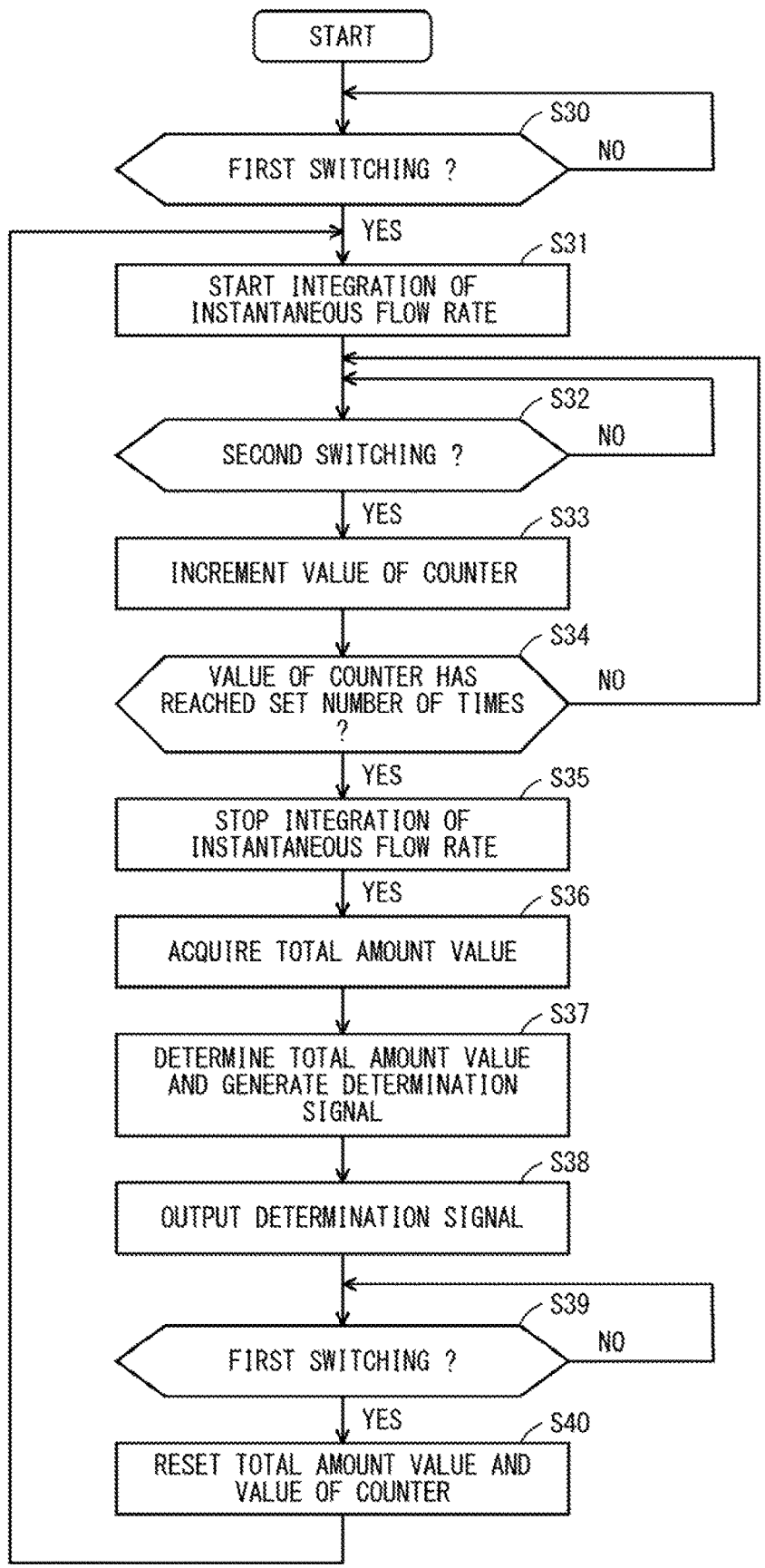
FIG. 10 is a flowchart showing a flow of a series of processing executed by the functional sections shown in FIG. 7 during measurement of a total amount by a total-amount-by-number-of-times measuring function.

FIG. 10 is a flowchart showing a flow of a series of processing executed by the functional sections shown in FIG. 7 during the measurement of a total amount by the total-amount-by-number-of-times measuring function. The processing shown in FIG. 10 is started by operating the operation section 203, for example, during the execution of the processing shown in FIG. 8. During the start, a counter is set in the memory in the control device 300. During the processing explained below, an instantaneous flow rate is measured in a micro period by the ultrasonic control section 301 and the flow-rate measuring section 302 shown in FIG.

7. In the initial state, the third allowable range and the set number of times are stored in advance in the storing section 205.

First, the switching determining section 303 shown in FIG. 7 determines the first switching on the basis of the instantaneous flow rate measured by the flow-rate measuring section 302 and the flow rate threshold th (step S30). When the first switching is not determined, the switching determining section 303 repeats the processing in step S30. On the other hand, when the first switching is determined, the integration control section 304 shown in FIG. 7 causes the flow-rate integrating section 305 to start integration of the instantaneous flow rate in response to the determination (step S31).

Subsequently, the switching determining section 303 determines the second switching on the basis of the instantaneous flow rate measured by the flow-rate measuring section 302 and the flow rate threshold th (step S32). When the second switching is not determined, the switching determining section 303 repeats the processing in step S32. On the other hand, when the second switching is determined, the integration control section 304 increments a value of the counter set in advance (step S33).

Subsequently, the integration control section 304 determines whether the value of the counter has reached a set number of times set in advance (step S34). When the value of the counter has not reached the set number of times, the switching determining section 303 returns to the processing in step S32. On the other hand, when the value of the counter has reached the set number of times, the integration control section 304 causes the flow-rate integrating section 305 to stop the integration of the instantaneous flow rate (step S35).

Subsequently, the acquiring section 307 shown in FIG. 7 acquires, as a total amount value, an integrated value of the instantaneous flow rate integrated from a point in time when the integration of the instantaneous flow rate is started by the processing in the immediately preceding step S31 to a point in time when the integration of the instantaneous flow rate is stopped by the processing in the immediately preceding step S35 (step S36).

Subsequently, the integrated-value determining section 308 shown in FIG. 7 determines whether the total amount value acquired by the acquiring section 307 in the processing in the immediately preceding step S36 is within the third allowable range stored in the storing section 205 and generates a determination signal indicating a result of the determination (step S37). Thereafter, the integrated-value determining section 308 gives the generated determination signal to the output circuit 206 shown in FIG. 7 to thereby cause the output circuit 206 to output the determination signal to the outside of the flow sensor 1 (step S38).

Subsequently, as in the processing in step S20, the switching determining section 303 shown in FIG. 7 determines the first switching (step S39). When the first switching is not determined, the switching determining section 303 repeats the processing in step S39. On the other hand, when the first switching is determined, the reset section 306 shown in FIG. 7 resets the total amount value integrated by the flow-rate integrating section 305 and the value of the counter in response to the determination of the first switching in step S39 (step S40). Thereafter, the integration control section 304 shown in FIG. 7 returns to the processing in step S31.

The series of processing ends, for example, when the power supply of the flow sensor 1 is switched from the ON state to the OFF state. Alternatively, the series of processing ends, for example, when measurement of an integrated flow rate value is commanded by the operation of the operation section 203 by the user. Alternatively, the series of processing ends, for example, when use of the total-amount-by-time measuring function, the first tuning function, or the second tuning function is commanded by the operation of the operation section 203 by the user.

With the total-amount-by-number-of-times measuring function, it is possible to acquire a total amount of the liquid flowing in the pipe P intermittently the set number of times. Consequently, for example, it is possible to easily acquire a total amount of the liquid discharged the set number of times by the dispenser. Therefore, convenience of the flow sensor 1 is improved.

When the total-amount-by-number-of-times measuring function is provided in the flow sensor 1, as in the example of the setting of the first and second allowable ranges aa and bb by the first and second tuning functions, the third allowable range may be set on the basis of an actual total amount of the liquid flowing in the pipe P intermittently the set number of times.

(b) In the flow sensor 1 according to the embodiment, one flow rate threshold th is set in advance in order to determine the first switching and the second switching. However, the present invention is not limited to this. In the flow sensor 1, two flow rate thresholds different from each other for respectively determining the first switching and the second switching may be set in advance. The two flow rate thresholds different from each other are set considering, for example, hysteresis of the instantaneous flow rate measured by the flow-rate measuring section 302.

The flow rate threshold for determining the first switching is set as a first flow rate threshold. The flow rate threshold for determining the second switching is set as a second flow rate threshold. In this case, the switching determining section 303 shown in FIG. 7 determines the first switching when the measured instantaneous flow rate exceeds the first flow rate threshold from a value equal to or smaller than the first flow rate threshold. The switching determining section 303 determines the second switching when the measured instantaneous flow rate decreases to a value equal to or smaller than the second flow rate threshold from a value larger than the second flow rate threshold.

Figure 11:
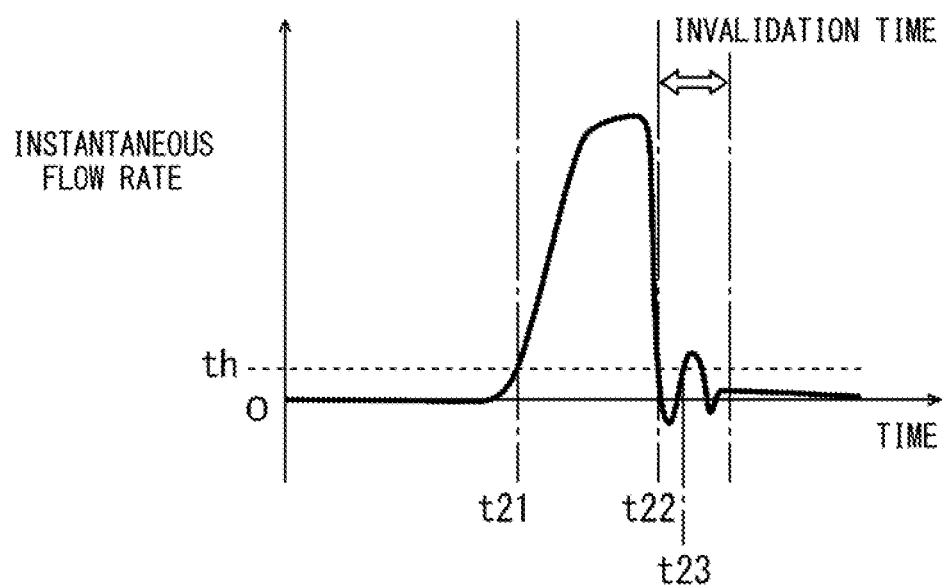
FIG. 11 is a diagram showing an example of a temporal change of an instantaneous flow rate measured by the flow sensor.

(c) FIG. 11 is a diagram showing an example of a temporal change of an instantaneous flow rate measured by the flow sensor 1. In the example shown in FIG. 11, the liquid intermittently flows in the pipe P, whereby the instantaneous flow rate value exceeds the flow rate threshold th from a value equal to or smaller than the flow rate threshold th at a point in time t21 and decreases to a value equal to or smaller than the flow rate threshold th from a value higher than the flow rate threshold th at a point in time t22. Consequently, the first switching is determined at the point in time t21. The second switching is determined at the point in time t22.

Immediately after the determination of the second switching, a flowing state of the liquid in the pipe P is likely to be unstable because of, for example, an operation characteristic of the dispenser. In the example shown in FIG. 11, the instantaneous flow rate fluctuates relatively large immediately after the point in time t22, whereby the instantaneous flow rate exceeds the flow rate threshold th at a point in time t23. Therefore, during the measurement of an integrated flow rate, the first switching is determined at the point in time t23, whereby a flow rate integrated value is reset at timing unintended by the user.

Therefore, in the flow sensor 1, for example, during the measurement of an integrated flow rate, the determination of the first switching may be invalidated for a fixed time from the point in time when the second switching is determined.

Figure 12:
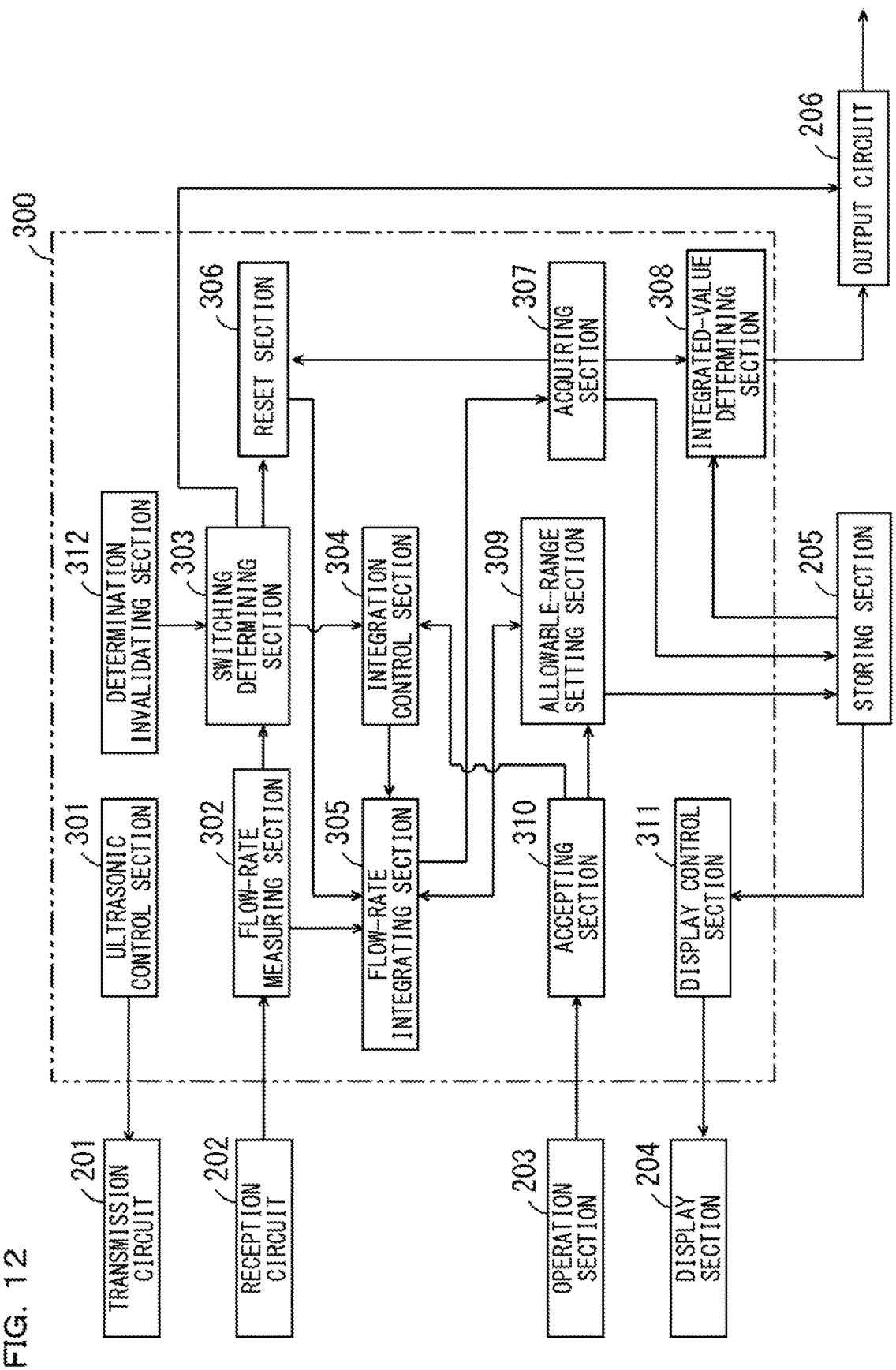
FIG. 12 is a block diagram showing a functional configuration of a control device according to another embodiment.

FIG. 12 is a block diagram showing a functional configuration of the control device 300 according to another embodiment. As shown in FIG. 12, the control device 300 in this example further includes a determination invalidating section 312 in addition to the components shown in FIG. 7.

The determination invalidating section 312 invalidates the determination by the switching determining section 303 for a predetermined fixed time (see a white arrow in FIG. 11) from the point in time when the second switching is determined by the switching determining section 303 (the point in time t22 in FIG. 11). In the following explanation, the fixed time predetermined to invalidate the determination is referred to as invalidation time. In this case, the determination is invalidated when the first switching is determined because the overshoot described above occurs immediately after the point in time when the second switching is determined. Consequently, the integrated flow rate value is prevented from being reset at unintended timing.

The length of the invalidation time is desirably set to cover a period when the overshoot is assumed to occur from the point in time when the second switching is determined. The invalidation time may be set on the basis of the operation of the operation section 203 shown in FIG. 1 by the user or may be set by the manufacturer during factory shipment of the flow sensor 1. The determination invalidating section 312 may be configured to be switchable to, on the basis of the operation of the operation section 203 by the user, an actuated state for invalidating the determination by the switching determining section 303 during the invalidation time and an unactuated state for not invalidating the determination by the switching determining section 303 during the invalidation time.

(d) In the flow sensor 1 according to the embodiment, during the measurement of an integrated flow rate, the integration of the instantaneous flow rate is started at the point in time when the first switching is determined and the integration of the instantaneous flow rate is stopped at the point in time when the second switching is determined. However, the present invention is not limited to this. The stop of the integration of the instantaneous flow rate may be performed after a fixed time elapses from the point in time when the second switching is determined.

In this case, for example, even when the liquid in the pipe P flows back in a period until the fixed time elapses from the point in time when the second switching is determined, an instantaneous flow rate of the flowing back liquid is integrated as a negative value. Consequently, it is possible to more accurately measure an integrated flow rate value in every flow of the liquid intermittently flowing in the pipe P.

(e) In the flow sensor 1 according to the embodiment, the determination signal indicating whether the integrated flow rate value is within the first allowable range aa is output and the determination signal indicating whether the total amount value of the liquid flowing in the pipe P in the set time is within the second allowable range bb is output. However, the present invention is not limited to these examples.

In the flow sensor 1, every time an instantaneous flow rate is measured, a determination signal indicating whether the measured instantaneous flow rate exceeds a predetermined instantaneous flow rate determination threshold may be output.

In this case, the instantaneous flow rate determination threshold may be set as explained below. For example, in a state in which the liquid continuously or intermittently flows in the pipe P and an instantaneous flow rate is measured in a micro period, a specific button of the operation section 203 is pressed long by the user. Therefore, a maximum instantaneous flow rate value is extracted from a plurality of instantaneous flow rate values measured while the specific button is pressed. The instantaneous flow rate determination threshold is set to have a predetermined rate (e.g., 90%) with respect to the extracted instantaneous flow rate value.

Alternatively, the instantaneous flow rate determination threshold may be set as explained below. For example, in a state in which the liquid is stationary in the pipe P and an instantaneous flow rate is measured in a micro period, the specific button of the operation section 203 is operated by the user. Therefore, an instantaneous flow rate value measured when the specific button is operated is acquired as a stationary value. In a state in which the liquid continuously flows in the pipe P and an instantaneous flow rate is measured in a micro period, the specific button of the operation section 203 is operated by the user. Therefore, an instantaneous flow rate value measured when the specific button is operated is acquired as a flowing value. A value between the acquired stationary value and the acquired flowing value is set as the instantaneous flow rate determination threshold.

(f) When an actual instantaneous flow rate value of the liquid flowing in the pipe P is known, the flow sensor 1 may have a correcting function for measuring an instantaneous flow rate of the liquid actually flowing in the pipe P on the basis of the operation of the user and correcting Expression (1) described above to set an instantaneous flow rate value obtained by the measurement to the known value.

(g) The flow sensor 1 according to the embodiment measures an instantaneous flow rate of the liquid flowing in the pipe P. However, the present invention is not limited to this. The flow sensor 1 only has to be configured to be capable of measuring a flow rate of fluid flowing in the pipe P. Therefore, the flow sensor 1 may be configured to be capable of measuring a flow rate of gas flowing in the pipe P. In this case, the flow sensor 1 may acquire, for example, the flow rate of the gas flowing in the pipe P as an instantaneous flow rate and acquire a total amount of the gas flowing in the pipe P in the set time.

(h) The flow sensor 1 according to the embodiment is the clamp-on type ultrasonic flow sensor that measures a flow rate by making an ultrasonic wave incident on the liquid in the pipe P. However, the present invention is not limited to this. A flow rate measuring device employing another measurement principle such as a Coriolis flow meter, an electromagnetic flow meter, a thermal flow meter, or an impeller-type flow meter can also be used instead of the head section 10 shown in FIG. 1, the transmission circuit 201 shown in FIG. 7, the reception circuit 202 shown in FIG. 7, the ultrasonic control section 301 shown in FIG. 7, and the flow-rate measuring section 302 shown in FIG. 7.

[12] Correspondence Relation Between the Constituent Elements of the Claims and the Sections in the Embodiment An example of correspondence between the constituent elements of the claims and the sections in the embodiment is explained below. However, the present invention is not limited to the example explained below.

In the embodiment, the pipe P is an example of the pipe. The flow sensor 1 is an example of the flow meter. The head section 10, the transmission circuit 201, the reception circuit 202, the ultrasonic control section 301, and the flow-rate measuring section 302 are examples of the flow-rate measuring section. The switching determining section 303 is an example of the switching determining section. The flow-rate integrating section 305 is an example of the flow-rate integrating section. The integration control section 304 is an example of the integration control section. The acquiring section 307 is an example of the acquiring section. The output circuit 206 is an example of the output section. The reset section 306 is an example of the reset section.

The flow rate threshold th is an example of the first flow rate threshold and the second low rate threshold. The first allowable range aa is an example of the allowable range of the integrated value. The allowable-range setting section 309 is an example of the first and second allowable-range setting sections. The integrated-value determining section 308 is an example of the first and second integrated-value determining sections. The first button 203a is an example of the first operation section. The second button 203b and the accepting section 310 are examples of the first accepting section. The second allowable range bb is an example of the allowable range of the total amount value.

The command for the total amount measurement by the total-amount-by-time measuring function is an example of the first total amount acquisition command. The third button 203c is an example of the second operation section. The command for the total amount measurement by the total-amount-by-number-of-times measuring function is an example of the second total amount acquisition command. The operation section 203 and the accepting section 310 are examples of the second accepting section.

The display section 204 is an example of the display section. The storing section 205 is an example of the storing section. The display control section 311 is an example of the display control section. The first and second ultrasonic elements 101 and 102 are examples of the pair of ultrasonic elements. The clamp member CL is an example of the clamp member. The determination invalidating section 312 is an example of the determination invalidating section.

As the constituent elements of the claims, other various elements having the configurations or the functions described in the claims can also be used.

What is claimed is:

1. A flow meter comprising:
   a sensing element generating a sensing signal corresponding to sensing of a fluid in a pipe; and
   a controller coupled to the sensing element; the controller comprising:
   a flow-rate measuring section configured to measure a flow rate of fluid flowing in a pipe;
   a switching determining section configured to determine first switching from a stationary state in which the fluid in the pipe is stationary to a flowing state in which the fluid in the pipe is flowing and determine second switching from the flowing state to the stationary state;
   a flow-rate integrating section configured to integrate the flow rate measured by the flow-rate measuring section;
   an integration control section configured to cause the flow-rate integrating section to start the integration of the flow rate in response to the determination of the first switching by the switching determining section and cause the flow-rate integrating section to stop the integration of the flow rate in response to the determination of the second switching by the switching determining section after the determination of the first switching;
   an acquiring section configured to acquire, as an integrated value, a value of the flow rate integrated by the flow-rate integrating section from a point in time when the integration of the flow rate is started in response to the determination of the first switching to a point in time when the integration of the flow rate is stopped in response to the determination of the second switching;
   an output section configured to output information concerning the integrated value acquired by the acquiring section; and
   a reset section configured to reset the integrated value integrated by the flow-rate integrating section from a point in time when the integrated value is acquired by the acquiring section to a point in time when next first switching is determined by the switching determining section.

2. The flow meter according to claim 1, wherein the switching determining section determines the first switching when the flow rate measured by the flow-rate measuring section exceeds a predetermined first flow rate threshold from a value equal to or smaller than the predetermined first flow rate threshold and determines the second switching when the flow rate measured by the flow-rate measuring section decreases to a value equal to or smaller than a predetermined second flow rate threshold from a value larger than the predetermined second flow rate threshold.

3. The flow meter according to claim 1, further comprising:
   a first allowable-range setting section configured to set an allowable range of the integrated value acquired by the acquiring section; and
   a first integrated-value determining section configured to determine whether the integrated value acquired by the acquiring section is within the allowable range of the integrated value set by the first allowable-range setting section, wherein
   the output section outputs a determination result by the first integrated-value determining section as the information concerning the integrated value.

4. The flow meter according to claim 3, further comprising a first operation section operated by a user in order to set the allowable range of the integrated value, wherein
   the first allowable-range setting section causes the flow-rate integrating section to start the integration of the flow rate when the operation of the first operation section is started, causes the flow-rate integrating section to stop the integration of the flow rate when the operation of the first operation section is ended, and sets the allowable range of the integrated value on the basis of a value of the flow rate integrated from a point in time when the operation of the first operation section is started to a point in time when the operation of the first operation section is ended.

5. The flow meter according to claim 1, further comprising a first accepting section configured to accept a first total amount acquisition command to measure a total amount of the fluid flowing in the pipe in a set time set in advance, wherein
   when the first total amount acquisition command is accepted by the first accepting section, the integration control section causes the flow-rate integrating section to start the integration of the flow rate in response to the determination of the first switching by the switching determining section and causes the flow-rate integrating section to stop the integration of the flow rate at a point in time when the set time elapses from a point in time when the first switching is determined,
   when the first total amount acquisition command is accepted by the first accepting section, the acquiring section acquires, as a total amount value, a value of the flow rate integrated by the flow-rate integrating section from the point in time when the integration of the flow rate is started in response to the determination of the first switching to the point in time when the set time elapses, and when the first total amount acquisition command is accepted by the first accepting section, the output section outputs information concerning the total amount value acquired by the acquiring section.

6. The flow meter according to claim 5, further comprising:

a second allowable-range setting section configured to set, when the first total amount acquisition command is accepted by the first accepting section, an allowable range of the total amount value acquired by the acquiring section; and a second integrated-value determining section configured to determine, when the first total amount acquisition command is accepted by the first accepting section, whether the total amount value acquired by the acquiring section is within the allowable range of the total amount value set by the second allowable-range setting section, wherein the output section outputs, when the first total amount acquisition command is accepted by the first accepting section, a determination result by the second integrated-value determining section as the information concerning the total amount.

7. The flow meter according to claim 6, further comprising a second operation section operated by a user in order to set the allowable range of the total amount value and the set time, wherein when the first total amount acquisition command is accepted by the first accepting section, the second allowable-range setting section causes the flow-rate integrating section to start the integration of the flow rate when the operation of the second operation section is started, causes the flow-rate integrating section to stop the integration of the flow rate when the operation of the second operation section is ended, sets the allowable range of the total amount value on the basis of a value of the flow rate integrated from a point in time when the operation of the second operation section is started to a point in time when the operation of the second operation section is ended, and sets, as the set time, a time from the point in time when the first switching is determined by the switching determining section after the operation of the second operation section is started to the point in time when the operation of the second operation section is ended.

8. The flow meter according to claim 1, further comprising a second accepting section configured to accept a second total amount acquisition command to measure a total amount of the fluid flowing in the pipe while the switching determining section repeatedly determines the first switching and the second switching a number of times set in advance, wherein when the second total amount acquisition command is accepted by the second accepting section, the integration control section causes the flow-rate integrating section to start the integration of the flow rate in response to the determination of the first switching by the switching determining section and causes the flow-rate integrating section to stop the integration of the flow rate in response to the set number of times of repeated determination of the first switching and the second switching from a point in time when the first switching is determined, when the second total amount acquisition command is accepted by the second accepting section, the acquiring section acquires, as a total amount value, a value of the flow rate integrated by the flow-rate integrating section from the point in time when the integration of the flow rate is started in response to the determination of the first switching to the point in time when the integration of the flow rate is stopped in response to the set number of times of the repeated determination of the first switching and the second switching, and when the second total amount acquisition command is accepted by the second accepting section, the output section outputs information concerning the total amount value acquired by the acquiring section.

9. The flow meter according to claim 1, further comprising:

a display section;

a storing section configured to store one or a plurality of integrated values acquired by the acquiring section from a predetermined time before present to the present; and a display control section configured to cause the display section to display a maximum and a minimum of the one or the plurality of integrated values stored in the storing section.

10. The flow meter according to claim 1, wherein the flow-rate measuring section includes:

a pair of ultrasonic elements configured to be capable of transmitting and receiving an ultrasonic wave; and a clamp member configured to fix the pair of ultrasonic elements to the pipe to transmit the ultrasonic wave between the pair of ultrasonic elements through the fluid in the pipe.

11. The flow meter according to claim 1, further comprising a determination invalidating section configured to invalidate the determination by the switching determining section for a predetermined invalidation time from a point in time when the second switching is determined by the switching determining section.

* * * * *